(12) United States Patent
Hong

(10) Patent No.: US 11,101,824 B2
(45) Date of Patent: Aug. 24, 2021

(54) ENCRYPTION DEVICE AND DECRYPTION DEVICE, AND OPERATION METHOD THEREOF

(71) Applicant: SAMSUNG ELECTRONICS CO., LTD., Suwon-si (KR)

(72) Inventor: Hyun-Sook Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 16/158,338

(22) Filed: Oct. 12, 2018

(65) Prior Publication Data

US 2020/0162113 A1    May 21, 2020

(30) Foreign Application Priority Data

Oct. 13, 2017  (KR) .................. 10-2017-0133471
Jun. 4, 2018   (KR) .................. 10-2018-0064477

(51) Int. Cl.
*H04L 29/00* (2006.01)
*H03M 13/00* (2006.01)
(Continued)

(52) U.S. Cl.
CPC ......... *H03M 13/616* (2013.01); *H03M 13/13* (2013.01); *H03M 13/3784* (2013.01); *H03M 13/45* (2013.01); *H04L 9/0631* (2013.01)

(58) Field of Classification Search
CPC ............. H03M 13/616; H03M 13/13; H03M 13/3784; H03M 13/45; H04L 9/0631;
(Continued)

(56) References Cited

U.S. PATENT DOCUMENTS 4,255,811 A * 3/1981 Adler ................. H04L 9/0618
                                                    380/37
7,106,860 B1 * 9/2006 Yu ..................... H04L 9/0631
                                                    380/255
(Continued)

FOREIGN PATENT DOCUMENTS

KR    1020160026313 A    3/2016

OTHER PUBLICATIONS

S. Chow, P. Eisen, H. Johnson, and P. C. V. Oorschot. White-Box Cryptography and an AES Implementation. In Selected Areas in Cryptography—SAC 2002. Springer, 2003.
(Continued)

*Primary Examiner* — Don G Zhao
(74) *Attorney, Agent, or Firm* — Volentine, Whitt & Francos, PLLC

(57) ABSTRACT

An operation method of an apparatus for decrypting input data of N*X bits (where N and X are positive integers) encrypted by using a block-level encryption algorithm, includes: receiving the input data and decoding the input data into data of N*Y bits (where Y is a positive integer) whose number is different from a number of N*X bits; performing first decryption operation processing of the block-level encryption algorithm on the data of N*Y bits; encoding the data of N*Y bits on which the first decryption operation processing is performed into intermediate data of N*X bits; and performing a plurality of intermediate round operations of a preset number based on the intermediate data of N*X bits.

20 Claims, 19 Drawing Sheets

(51) Int. Cl.
*H03M 13/45* (2006.01)
*H04L 9/06* (2006.01)
*H03M 13/13* (2006.01)
*H03M 13/37* (2006.01)

(58) Field of Classification Search
CPC ..... H04L 9/0618; H04L 9/14; H04L 63/1466; H04L 2209/24; H04L 2209/34; H04L 2209/16
See application file for complete search history.

(56) References Cited

U.S. PATENT DOCUMENTS

| | | | |
|---|---|---|---|
| 7,257,229 B1* | 8/2007 | Leshem | H04L 9/0631 380/277 |
| 7,639,797 B2* | 12/2009 | Lee | H04L 9/0631 380/28 |
| 8,504,845 B2* | 8/2013 | Farrugia | G06F 21/602 713/189 |
| 8,670,559 B2* | 3/2014 | Michiels | G06F 7/723 380/28 |
| 8,705,731 B2* | 4/2014 | Trichina | H04L 9/0618 380/28 |
| 8,767,957 B1* | 7/2014 | Bagchi | G09C 1/00 380/29 |
| 8,861,719 B2* | 10/2014 | Lee | G06F 7/766 380/28 |
| 9,143,317 B2 | 9/2015 | Chevallier-Mames et al. | |
| 9,509,495 B2* | 11/2016 | Lee | G09C 1/00 |
| 9,577,821 B2 | 2/2017 | Kim et al. | |
| 9,654,280 B2* | 5/2017 | Michiels | H04L 9/0631 |
| 9,787,470 B2* | 10/2017 | Pisek | H04L 9/0631 |
| 10,291,390 B2* | 5/2019 | Choi | H04L 9/002 |
| 10,728,026 B2* | 7/2020 | Choi | H04L 9/3242 |
| 2003/0002664 A1* | 1/2003 | Anand | H04L 9/0625 380/37 |
| 2004/0071288 A1* | 4/2004 | Romain | H04L 9/003 380/37 |
| 2006/0050887 A1* | 3/2006 | Chen | H04L 9/0631 380/270 |
| 2007/0286415 A1* | 12/2007 | Bertoni | H04L 9/3242 380/37 |
| 2008/0285745 A1* | 11/2008 | Teglia | H04L 9/0631 380/29 |
| 2009/0214024 A1* | 8/2009 | Schneider | H04L 9/0625 380/28 |
| 2010/0014659 A1* | 1/2010 | Shibutani | H04L 9/0625 380/28 |
| 2010/0027783 A1* | 2/2010 | Yup | H04L 9/0643 380/44 |
| 2011/0235803 A1* | 9/2011 | Doumen | H04N 21/266 380/255 |
| 2012/0076293 A1* | 3/2012 | Smith | H04L 9/0656 380/28 |
| 2012/0121083 A1* | 5/2012 | You | H04L 9/0631 380/28 |
| 2012/0170739 A1* | 7/2012 | Karroumi | H04L 9/002 380/28 |
| 2013/0067212 A1* | 3/2013 | Farrugia | H04L 9/0631 713/150 |
| 2014/0109240 A1* | 4/2014 | Pomerantz | G06F 21/85 726/27 |
| 2015/0163054 A1* | 6/2015 | Roelse | H04L 9/0838 380/278 |
| 2015/0222421 A1 | 8/2015 | Guo et al. | |
| 2015/0263852 A1* | 9/2015 | Alon | H04L 9/0618 380/28 |
| 2015/0349950 A1* | 12/2015 | Shrimpton | G06F 12/1408 713/189 |
| 2015/0349951 A1* | 12/2015 | Farrugia | G06F 9/30007 380/28 |
| 2016/0065361 A1* | 3/2016 | Choi | H04L 9/0631 380/287 |
| 2016/0080143 A1* | 3/2016 | Kindarji | H04L 9/0637 380/28 |
| 2016/0232109 A1* | 8/2016 | Canter | G06F 3/0623 |
| 2016/0261405 A1* | 9/2016 | Chevallier-Mames | H04L 9/0631 |
| 2016/0359618 A1* | 12/2016 | Kindarji | H04L 9/0631 |
| 2017/0104581 A1* | 4/2017 | Hars | H04L 9/0861 |
| 2017/0126397 A1* | 5/2017 | Michiels | G09C 1/00 |
| 2017/0180119 A1* | 6/2017 | Michiels | H04L 9/0819 |
| 2017/0286647 A1* | 10/2017 | Michiels | H04L 9/002 |
| 2018/0150471 A1* | 5/2018 | Gopal | G06F 9/505 |

OTHER PUBLICATIONS

T. Lepoint, M. Rivain, Y. D. Mulder, P. Roelse, and B. Preneel. Two Attacks on a White-Box AES Implementation, Selected Areas in Cryptography—SAC 2013.

Y. Xiao and X. Lai. A Secure Implementation of White-box AES. In Computer Science and its Applications—CSA 2009.

Y. D. Mulder, P. Roelse, and B. Preneel. Cryptanalysis of the Xiao—Lai White-Box AES Implementation., Selected Areas in Cryptography—SAC 2012.

M. Karroumi. Protecting White-Box AES with Dual Ciphers., Security and Cryptology—ICISC 2010.

Chung Hun Baek, Jung Hee Cheon, Hyunsook Hong, White-box AES implementation revisited. Journal of Communications and Networks.

Jung Hee Cheon, Hyunsook Hong, Joohee Lee and Jooyoung Lee, An Efficient Affine Equivalence Algorithm for Multiple S-Boxes and a Structured Affine Layer, Selected Areas in Cryptography—SAC 2016.

Xuejia Lai "A secure implemental of White-Box AES," ResearchGate, Nov. 29, 2016.

* cited by examiner

ENCRYPTION DEVICE AND DECRYPTION DEVICE, AND OPERATION METHOD THEREOF

CROSS-REFERENCE TO RELATED APPLICATIONS

This application claims the benefit of Korean Patent Application Nos. 10-2017-0133471 and 10-2018-0064477, respectively filed on Oct. 13, 2017 and Jun. 4, 2018, in the Korean Intellectual Property Office, the disclosures of which are incorporated herein in their entirety by reference.

BACKGROUND

The inventive concept relates to an encryption/decryption device and an operation method thereof, and more particularly, to an encryption/decryption device for executing an encryption/decryption algorithm according to blocks, and an operation method of the encryption/decryption device.

As attackers' ability has improved with the advance in communication technology and information processing technology, the demand for safe cryptographic systems has increased. A cryptographic algorithm has been developed on the premise that when it is assumed that a terminal on which the cryptographic algorithm operates and a user who uses the terminal are trustable, an attacker, who obtains ciphertext, is unable to decrypt the ciphertext if an encryption key is not exposed even when the cryptographic algorithm is disclosed. However, in an actual environment, the user participating in communication may directly become an attacker and may leak the encryption key to a third party. Also, malware installed in the terminal may become an attacker and may extract the encryption key by using intermediate calculations of the ciphertext, decrypted plaintext, or the ciphertext remaining in a memory as well as the encryption key itself.

As a solution to the problem, white box cryptography has emerged as a core technology for protecting software and content and preventing illegal leaks. In white box cryptography, since an encryption key is hidden into an algorithm in software, an intermediate operation value and the encryption key in a process of executing a cryptographic algorithm are not directly exposed. That is, in white box cryptography, since an encryption algorithm is changed to lookup tables and an encryption key is hidden into the lookup tables, an attacker is unable to derive the actual encryption key even when the attacker monitors an encryption key process.

SUMMARY

The inventive concept relates to an encryption device, a decryption device, and an operation method thereof, and provides an operation method of an encryption device and a decryption device that perform an encoding operation and a decoding operation, before and after operation processing, according to an encryption algorithm.

According to an aspect of the inventive concept, there is provided an apparatus for decrypting input data of N*X bits (where N and X are positive integers) which are encrypted based on a block-level encryption algorithm, the apparatus including: an encryption/decryption controller including a state buffer configured to store the input data; and a data function module configured to sequentially perform, based on the input data, a final round operation of performing first decryption operation processing, a plurality of intermediate round operations of performing second decryption operation processing, and an initial round operation of performing third decryption operation processing, wherein the data function module is further configured to decode the input data into data of N*Y bits whose number is different from a number of the N*X bits, perform the first decryption operation processing based on the data of N*Y bits (where Y is a positive integer), and encode the data of N*Y bits on which the first decryption operation processing is performed into intermediate data of N*X bits.

According to another aspect of the inventive concept, there is provided an operation method of an encryption/decryption device, the operation method including: an interface of the encryption/decryption device receiving input data of N*X bits (where N and X are positive integers) which are encrypted based on a block-level encryption algorithm; decoding the input data of N*X bits into data of N*Y bits (where Y is a positive integer) whose number is different from a number of N*X bits; performing first decryption operation processing of the block-level encryption algorithm on the data of N*Y bits; encoding the data of N*Y bits on which the first decryption operation processing is performed into intermediate data of N*X bits; and performing a plurality of intermediate decryption round operations of the block-level encryption algorithm on the intermediate data of N*X bits.

According to yet another aspect of the inventive concept, there is provided an operation method of an apparatus for decrypting input data of N*X bits (where N and X are positive integers) which are encrypted by using a block-level encryption algorithm, the operation method including: receiving the input data and decoding the input data into data of N*Y bits (where Y is a positive integer) whose number is different from a number of N*X bits; performing first decryption operation processing of the block-level encryption algorithm on the data of N*Y bits; encoding the data of N*Y bits on which the first decryption operation processing is performed into intermediate data of N*X bits; and performing a plurality of intermediate round operations of a preset number based on the intermediate data of N*X bits.

According to still another aspect of the inventive concept, there is provided an apparatus comprising: an interface configured to receive input data of N L X bits (where N and X are positive integers) which are encrypted based on a block-level encryption algorithm; and an encryption/decryption device. The encryption/decryption device comprises: a state buffer which is configured to store the input data, and a data function module. The data function module is configured to sequentially perform, based on the input data: a final round operation of performing first decryption operation processing on the input data, a plurality of intermediate round operations of performing second decryption operation processing on final round data output from the final round operation, and an initial round operation of performing third decryption operation processing on intermediate round data output from the plurality of intermediate round operations. The data function module is further configured to decode the input data into the final round data of N*Y bits (where Y is a positive integer) whose number is different from a number of the N*X bits, perform the first decryption operation processing on the final round data of N*Y bits, and encode the final round data of N*Y bits on which the first decryption operation processing is performed into intermediate data of N*X bits. The input data is output from the block-level encryption algorithm which sequentially performs an inverse of the initial round operation, a plurality of inverses of the intermediate round operations, and an inverse of the final round operation.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

The inventive concept will now be described more fully with reference to the accompanying drawings, in which embodiments are shown.

Figure 1:
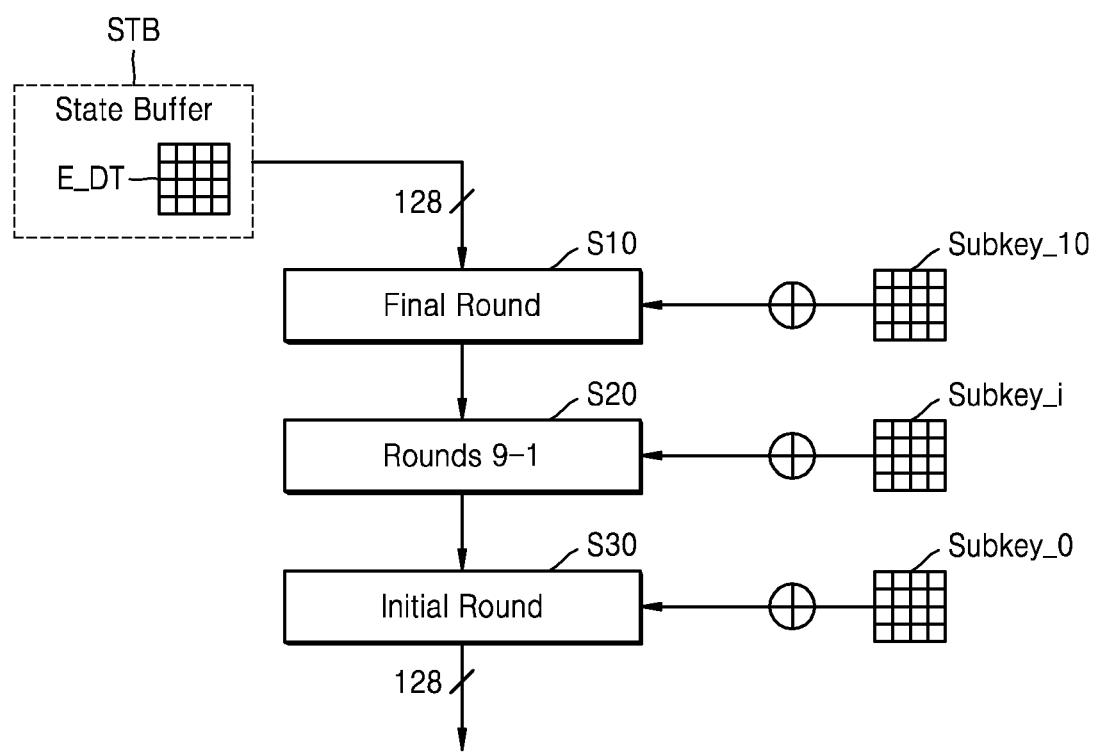
FIG. 1 is a diagram for describing an embodiment of a decryption algorithm operating on block-level input data.

FIG. 1 is a diagram for describing an embodiment of a decryption algorithm operating on block-level input data.

Referring to FIG. 1, a decryption operation according to a decryption algorithm may be performed in an order of a final round operation S10, one or more intermediate round operations S20, and finally an initial round operation S30. The decryption algorithm may be performed in an order on input data encrypted based on a block-level encryption algorithm, opposite to the order of the block-level encryption algorithm. Also, some operation processing of the decryption algorithm may be inverse to a corresponding operation processing of the block-level encryption algorithm. That is, the block-level encryption algorithm may be performed in an order of the initial round operation (inverse to S30), then the intermediate round operation(s) (inverse to S20), and finally the final round operation (inverse to S10).

In the decryption operation of FIG. 1, first the final round operation S10 may be performed on data E_DT, which is block-level data loaded to a state buffer STB, by using a subkey Subkey_10. The data E_DT on which the final round operation S10 is performed may be 128-bit data. However, this is merely an example for convenience of explanation and embodiments are not limited thereto. When the data E_DT is 128-bit data, that is, 16-byte data, the data E_DT may be input as a 4×4 matrix. Each component of the 4×4 matrix may correspond to one byte of the 16 byte data. Next, the intermediate round operation(s) S20 using a subkey Subkey_i, and the initial round operation S30 using a subkey Subkey_0, may be sequentially performed. Here, intermediate round operations S20 comprises nine rounds, sequentially performed from the ninth round to the first round. Although the total number of rounds in intermediate round operations S20 and initial round operation S30 is 10 in the present example for convenience of explanation, this is merely an example and embodiments are not limited thereto.

In the final round operation S10, the intermediate round operation(s) S20, and the initial round operation S30, each byte of the data E_DT to be operated upon may be combined with the subkeys Subkey_10, Subkey_i, and Subkey_0, respectively. A size of each of the subkeys Subkey_10, Subkey_i, and Subkey_0 in the final round operation S10, the intermediate round operation S20, and the initial round operation S30 may be the same as a size of the data E_DT. The subkeys Subkey_10, Subkey_i, and Subkey_0 may be generated by processing an encryption key based on, for example, a key-scheduling algorithm. Data decrypted through each of the round operations S10 through S30 may be 128-bit data.

Figure 2:
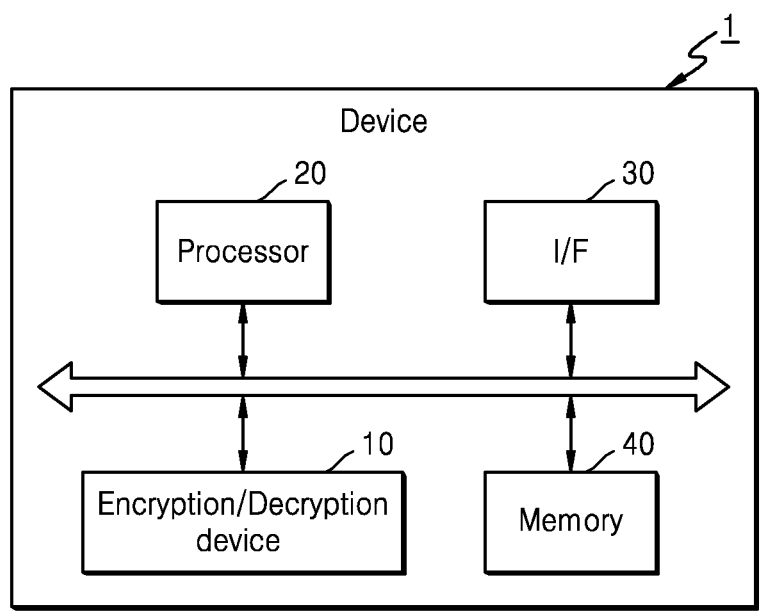
FIG. 2 is a block diagram of an embodiment of an apparatus.

FIG. 2 is a block diagram of an embodiment of an apparatus 1.

Referring to FIG. 2, apparatus 1 may include an encryption/decryption device 10, a processor 20, an interface (I/F) 30, and a memory 40. Apparatus 1 may transmit/receive data DT to/from an external apparatus for example via IF 30. For example, apparatus 1 may transmit/receive the data DT to/from a smart card, a memory card, or another device. Although examples of apparatus 1 may include a smartphone, a personal digital assistant (PDA), a phablet, a desktop personal computer (PC), a laptop PC, a tablet PC, a server, a sensor, a wearable device (e.g., smart glasses or a head-mounted device (HMD)), an electronic garment, an electronic bracelet, an electronic necklace, a smart mirror, and a smart watch, apparatus 1 is not limited thereto and may have any name or form as long as apparatus 1 has a data encryption function.

Processor 20 may transmit/receive the data DT to/from the outside of apparatus 1 through I/F 30. Processor 20 may execute a task and may store a result of the task in memory 40. Processor 20 may include at least one from among a central processing unit (CPU), an application processor (AP), and a communication processor (CP). Also, processor 20 may include a plurality of cores.

Memory 40 may store various data needed to operate processor 20. Memory 40 may be implemented as, for example, dynamic random-access memory (DRAM), mobile DRAM, static RAM (SRAM), phase-change RAM (PRAM), ferroelectric RAM (FRAM), resistive RAM (RRAM or ReRAM), and/or magnetic RAM (MRAM).

Encryption/decryption device 10 may encrypt and/or decrypt the data DT received from the outside of apparatus 1. Encryption/decryption device 10 may maintain security of the data DT by performing an encryption operation and/or a decryption operation based on an encryption algorithm. The encryption algorithm may be, for example, an algorithm of generating encrypted data by using an encryption key. The encryption algorithm may include any of various algorithms such as message-digest algorithm (MD5), secure hash algorithm (SHA), Rivest-Shamir-Adleman (RSA), advanced encryption standard (AES), or data encryption standard (DES).

Although encryption/decryption device 10 is included in apparatus 1 in the present embodiment, this is merely an example and embodiments are not limited thereto. For example, an encryption/decryption module of performing an operation method of encryption/decryption device 10 may be implemented based on processor 20 and memory 40. The encryption/decryption module may include a program, a routine, sets of instructions, or a process for performing an encryption or decryption operation. The term 'module' may refer to, for example, a unit including one or more from among hardware, software, and firmware. The 'module' may be interchangeably used with a term such as unit, logic, logic block, component, or circuit. The 'module' may be a portion or a minimum unit of an integrated component. The 'module' may be a portion or a minimum unit for performing one or more functions.

Figure 3:
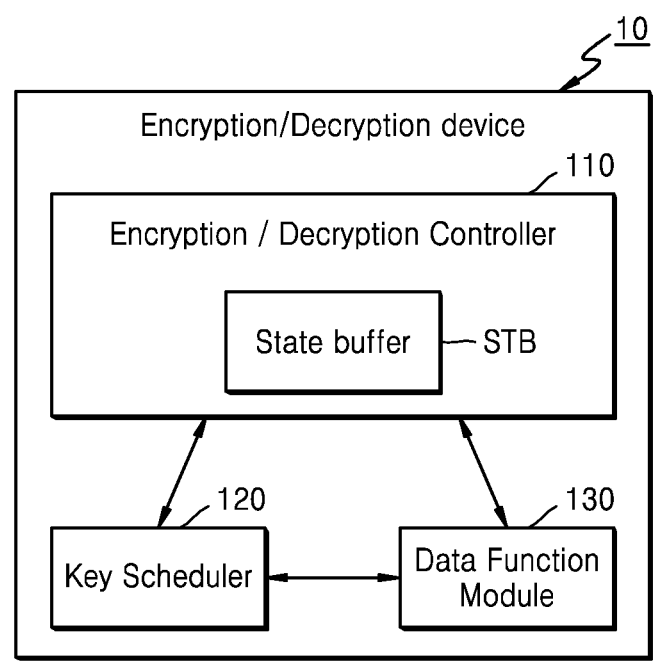
FIG. 3 is a detailed block diagram of an embodiment of an encryption/decryption device.

FIG. 3 is a detailed block diagram of an embodiment of an encryption/decryption device. FIG. 3 is a detailed block diagram of, for example, encryption/decryption device 10.

Referring to FIG. 3, encryption/decryption device 10 may include an encryption/decryption controller 110, a key scheduler 120, and a data function module 130. Encryption/decryption controller 110 may control an overall operation of encryption/decryption device 10. For example, encryption/decryption controller 110 may control key scheduler 120 to process an encryption key and/or output the processed encryption key. Also, encryption/decryption controller 110 may control data function module 130 to perform an encryption/decryption operation on the input data DT based on the encryption key.

Encryption/decryption controller 110 may include the state buffer STB. The state buffer STB may store the data DT that is input data and/or data derived through each round of operation.

For example, during a decryption operation, the data DT stored in the state buffer STB may be applied to data function module 130 and a final round operation may be performed based on the data DT. Intermediate data may be derived according to the final round operation based on the data DT and may be updated to the state buffer STB. Also, the intermediate data may be applied again to data function module 130, and a plurality of intermediate round operations may be performed based on the intermediate data. Intermediate round data may be derived according to the plurality of intermediate round operations based on the intermediate data and may be updated to the state buffer STB. Also, the intermediate round data may be applied again to data function module 130, and an initial round operation may be performed based on the intermediate round data. Decryption data may be derived according to the initial round operation based on the intermediate round data and may be updated to the state buffer STB.

Although not shown in FIG. 3, encryption/decryption controller 110 may include a plurality of registers that store encryption keys for encryption or decryption algorithm operations. In other words, encryption/decryption controller 110 may include registers that store encryption keys based on which round of operations is performed. For example, encryption/decryption controller 110 may store a pre-processed encryption key in a register and may send the pre-processed encryption key to key scheduler 120. Also, encryption/decryption controller 110 may receive an encryption key (e.g., a subkey) processed by key scheduler 120 and may update the encryption key to the register.

Key scheduler 120 may process a required encryption key according to each round of operation. In an embodiment, key scheduler 120 may receive an encryption key stored in a register and may process the encryption key based on a preset rule according to each round of operation. After the encryption key is processed, key scheduler 120 may send the processed encryption key to data function module 130. Also, key scheduler 120 may send the processed encryption key to encryption/decryption controller 110 so that the processed encryption key is updated to the register that provided the pre-processed encryption key. The processed encryption key may be referred to as, for example, a subkey.

Data function module 130 may perform an encryption/decryption operation on the data DT based on the processed encryption key. Data function module 130 may perform an encryption/decryption operation through, for example, permutation that rearranges bits of the data DT based on the encryption key. Alternatively, data function module 130 may perform an encryption operation through substitution that replaces the data DT with mapped data based on the encryption key. Data function module 130 may update the mapped data obtained after the encryption operation to the state buffer STB.

During a decryption operation, data function module 130 may perform a final round operation, a plurality of intermediate round operations, and an initial round operation on encrypted input data. Each of the final round operation, the plurality of intermediate round operations, and the initial round operation may perform operation processing according to a decryption algorithm. For example, the operation processing may include at least one operation from among an addroundkey operation AddRoundKey (ARK), an inverse shiftrows operation Inverse ShiftRows (ISR), an inverse subbytes operation Inverse SubBytes (ISB), and an inverse mix-column Inverse Mixcolumns (IMC). Alternatively, during an encryption operation, operation processing may include at least one operation from among an addroundkey operation, a shiftrows operation, a subbytes operation, and a mixcolumns operation.

In an embodiment, during a final round operation data function module 130 may transform received data of N*X bits (where N and X are each positive integers) into data of N*Y bits (where Y is a positive integer) whose number is different from the number of N*X bits, and may perform operation processing on the data of N*Y bits. Also, in an embodiment, data function module 130 may transform data of N*X bits received during an intermediate round operation into data of N*Y bits, and may perform operation processing on the data of N*Y bits. Also, in an embodiment, data function module 130 may transform data of N*X bits received during an initial round operation into data of N*Y bits and may perform operation processing on the data of N*Y bits.

Figure 4:
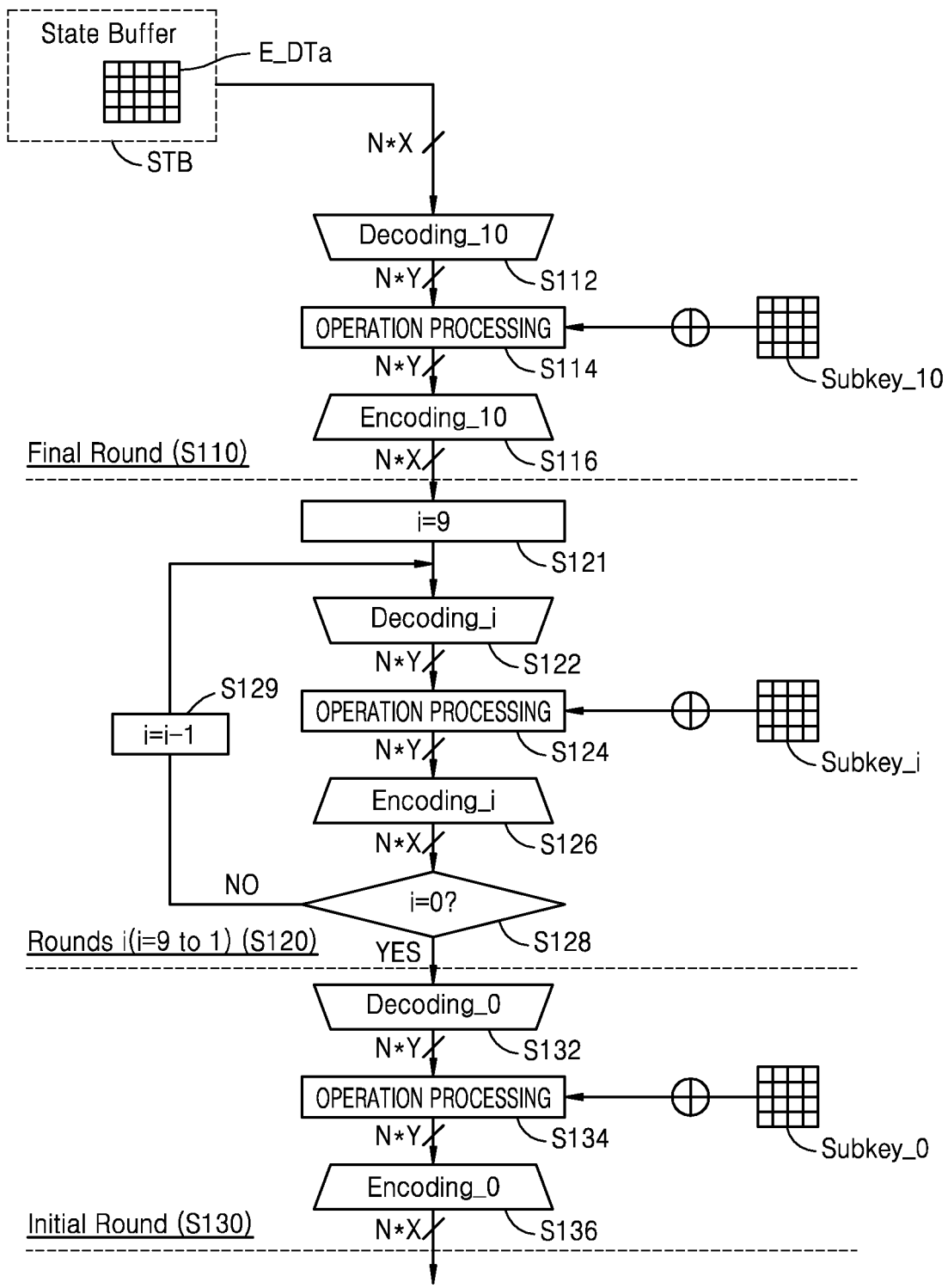
FIG. 4 is a diagram for describing an embodiment of an operation method of an encryption/decryption device.

FIG. 4 is a diagram for describing an operation method of an embodiment of an encryption/decryption device. Although an operation of the encryption/decryption device will be described focusing on a decryption operation for convenience of explanation, the technical concepts described herein may be applied appropriately to an encryption operation.

Referring to FIG. 4, a final round operation S110, an intermediate round operation S120, and an initial round operation S130 may be sequentially performed on data E_DTa that is block-level data loaded to the state buffer STB. In an embodiment, the data E_DTa may be data of N*X bits (N and X are positive integers). For example, when the data E_DTa is 160-bit data, N may be 16 and X may be 10. Also, in this case, the data E_DTa may be input as a 4×5 matrix. Each component of the 4×5 matrix may correspond to one 16-bit byte among 20 bytes when the data E_DTa is 160-bit data.

In the final round operation S110, a decoding operation S112, an operation processing S114, and an encoding operation S116 may be performed. For example, when the decoding operation S112 is performed in the final round operation S110, an operation of cancelling the decoding operation S112 may be performed outside the encryption/decryption device before the decoding operation S112 is performed. Although the decoding operation S112 is performed in the final round operation S110 in FIG. 4, this is merely an example and embodiments are not limited thereto. In other words, during the final round operation S110, the encryption/decryption device may directly perform the operation processing S114 on data of N*Y bits from the state buffer STB.

In an embodiment, the data E_DTa of N*X bits may be transformed into data of N*Y bits whose number is different from the number of N*X bits through the decoding operation S112. N, X, and Y may be positive integers, and specifically, X may be a positive integer greater than Y. In an embodiment, X and Y may have a relationship of Equation 1:

$$X=Y+a, (0<a\leq Y). \quad (1)$$

For example, the decoding operation S112 may transform the data of N*X bits into the data of N*Y bits by applying to the data E_DTa N X-bit nonlinear functions and N linear functions that may be represented as Y×X matrices, which will be described below in detail.

In the operation processing S114, an operation according to a decryption algorithm may be performed on the data of N*Y bits. For example, the operation processing S114 may include at least one operation from among an addroundkey operation, an inverse shiftrows operation, an inverse subbytes operation, and an inverse mixcolumns operation. When the addroundkey operation is performed in the operation processing S114, the addroundkey operation may be performed based on the subkey Subkey_10. In this case, since the operation processing S114 is performed on the data of N*Y bits, the subkey Subkey_10 may also be key data of N*Y bits. In the addroundkey operation, for example, an XOR operation may be performed byte per byte between the data of N*Y bits and the key data of N*Y bits.

In an embodiment, the data of N*Y bits output through the operation processing S114 may be transformed into intermediate data of N*X bits through the encoding operation S116. The intermediate data may refer to, for example, data output from the final round operation S110 and input to the intermediate round operation S120. In an embodiment, the encoding operation S116 may transform the data of N*Y bits into the intermediate data of N*X bits by applying N X-bit nonlinear functions to the data of N*Y bits output through the operation processing S114, which will be described below in detail.

In the intermediate round operations S120, a plurality of rounds of operations may be repeatedly performed. Although in the illustrated example the intermediate round operation S120 is repeatedly performed 9 times for convenience of explanation, embodiments are not limited thereto. The intermediate round operations S120 may start from an initialization operation S121 of initializing a variable i to 9.

After the initialization operation S121, the intermediate round data of N*X bits may be transformed into intermediate round data of N*Y bits through a decoding operation S122. The intermediate round data may refer to, for example, data on which operation processing S124 of each intermediate round operation S120 is performed.

In an embodiment, the decoding operation S122 may transform the intermediate data of N*X bits into the intermediate round data of N*Y bits by applying N X-bit nonlinear functions and N linear functions that may be represented as Y×X matrices to the intermediate data of N*X bits. The decoding operation S122 of a first intermediate round operation (i.e., round 9) in the intermediate round operations S120 may include dividing the data of N*X bits into N pieces of X-bit data and applying a nonlinear function to each of the N pieces of X-bit data. In an embodiment, the nonlinear function may be an inverse function of the nonlinear function used in the encoding operation S116.

In the operation processing S124, an operation according to the decryption algorithm may be performed on the intermediate round data of N*Y bits. For example, the operation processing S124 may include at least one operation from among an addroundkey operation, an inverse shiftrows operation, an inverse subbytes operation, and an inverse mixcolumns operation. When the addroundkey operation is performed in the operation processing S124, the addroundkey operation may be performed based on the subkey Subkey_i. In this case, since the operation processing S124 is performed on the round data of N*Y bits, the subkey Subkey_i may also be key data of N*Y bits. The addroundkey operation may be performed through an XOR operation byte per byte between the data of N*Y bits and the key data of N*Y bits.

The intermediate round data of N*Y bits output through the operation processing S124 may be transformed into intermediate round data of N*X bits through an encoding operation S126. The encoding operation S126 may transform the intermediate round data of N*Y bits into the intermediate round data of N*X bits by applying N pieces of X-bit nonlinear functions to the round data of N*Y bits output through the operation processing S124. For example, the encoding operation S126 may include transforming the intermediate round data of N*Y bits into the intermediate round data of N*X bits by applying a (N*X)×(N*Y) matrix operation, dividing the data of N*X bits into N pieces of X-bit data, and applying a nonlinear function to each of the N pieces of X-bit data.

In an embodiment, a nonlinear function applied during an encoding operation in an $i^{th}$ intermediate round operation may be inverse to a nonlinear function applied during a decoding operation in an $(i-1)^{th}$ intermediate round operation. However, a case where i=1 may be excluded. For example, a nonlinear function may be applied to intermediate round data of N*Y bits during an encoding operation in a $9^{th}$ intermediate round operation, and a nonlinear function that is inverse to the nonlinear function may be applied to intermediate round data of N*X bits during a decoding operation in an $8^{th}$ intermediate round operation that is performed after the $9^{th}$ intermediate round operation. Accordingly, the encoding operation in the $i^{th}$ intermediate round operation and the decoding operation in the $(i-1)^{th}$ intermediate round operation may be cancelled out.

After the encoding operation S126, it may be determined in operation S128 whether the variable i is 1. When the variable i is not 1, the value of i may be reduced by 1 in operation S129 and the decoding operation S122 may be performed again. Otherwise, when the variable i is 1, the intermediate round operations S120 may end and the initial round operation S130 may start.

In the initial round operation S130, a decoding operation S132, an operation processing S134, and an encoding operation S136 may be performed. For example, when the encoding operation S136 is performed in the initial round operation S130, an operation of cancelling the encoding operation S136 may be performed outside the encryption/decryption device before the encoding operation S130 is performed. Although the encoding operation S136 is performed in the initial round operation S130 in the present embodiment, this is merely an example, and embodiments are not limited thereto. In other words, during the initial round operation S130, the encryption/decryption device may directly output data of N*Y bits.

In an embodiment, in the decoding operation S132, the intermediate round data of N*X bits obtained through the encoding operation S126 in a last intermediate round operation (i.e., an intermediate round operation with the variable i of 1) from among the intermediate round operations may be transformed into initial round data of N*Y bits. The initial round data may refer to data based on which the operation processing S134 of the initial round operation S130 is performed.

In an embodiment, the decoding operation S132 may transform the round data of N*X bits into the initial round data of N*Y bits by applying N pieces of X-bit nonlinear functions and N pieces of linear functions that may be represented as Y×X matrices to the round data of N*X bits. For example, the decoding operation S132 may include dividing the round data of N*X bits into N pieces of X-bit data and applying a nonlinear function to each of the N pieces of X-bit data. In an embodiment, the nonlinear function used in the decoding operation S132 may be inverse to a nonlinear function used in the encoding operation S126 in the last intermediate round operation (i.e., the intermediate round operation with the variable i of 1) among the intermediate round operations.

In the operation processing S134, an operation according to the decryption algorithm may be performed on the initial round data of N*Y bits. For example, the operation processing S134 may include at least one operation from among an addroundkey operation, an inverse shiftrows operation, and an inverse subbytes operation. When the addroundkey operation is performed in the operation processing S134, the addroundkey operation may be performed based on the subkey Subkey_0. In this case, since the operation processing S134 is performed on the initial round data of N*Y bits, the subkey Subkey_0 may also be key data of N*Y bits. In the addroundkey operation, for example, an XOR operation may be performed byte per byte between the data of N*Y bits and the key data of N*Y bits.

According to an embodiment, when data of N*Y bits is encrypted/decrypted, data of N*X bits may be externally moved, and actual operation processing may be performed on the data of N*X bits. In other words, since the number of bits of decryption data (or encryption data) that is input and output may be different from the number of bits of data during each round of operation, algebraic properties of an intermediate result value of each round of operation may be changed in the decryption data (or the encryption data). Accordingly, a third party may not know an internal operation of each round, thereby further improving the security of the encryption/decryption device.

Figure 5A:
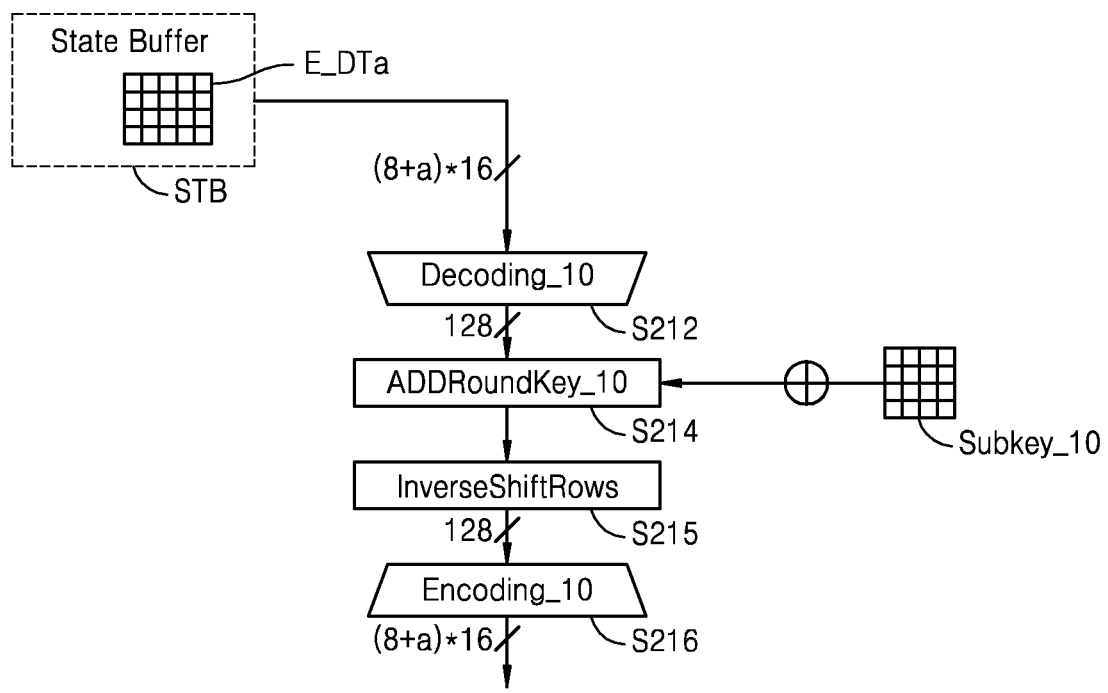
FIGS. 5A, 5B, 5C and 5D are detailed diagrams for describing an embodiment of a final round operation.
Figure 5B:
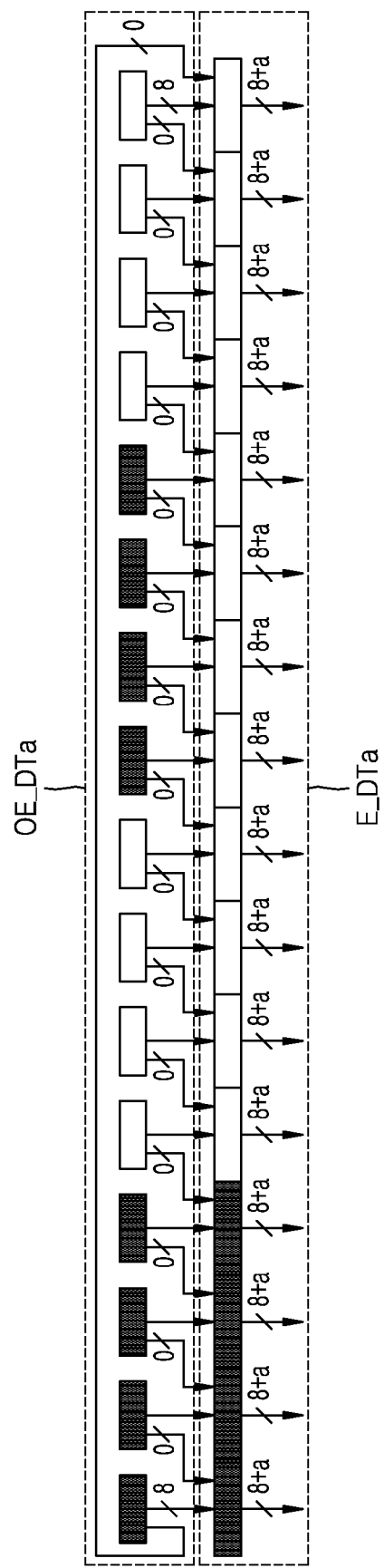
Figure 5C:
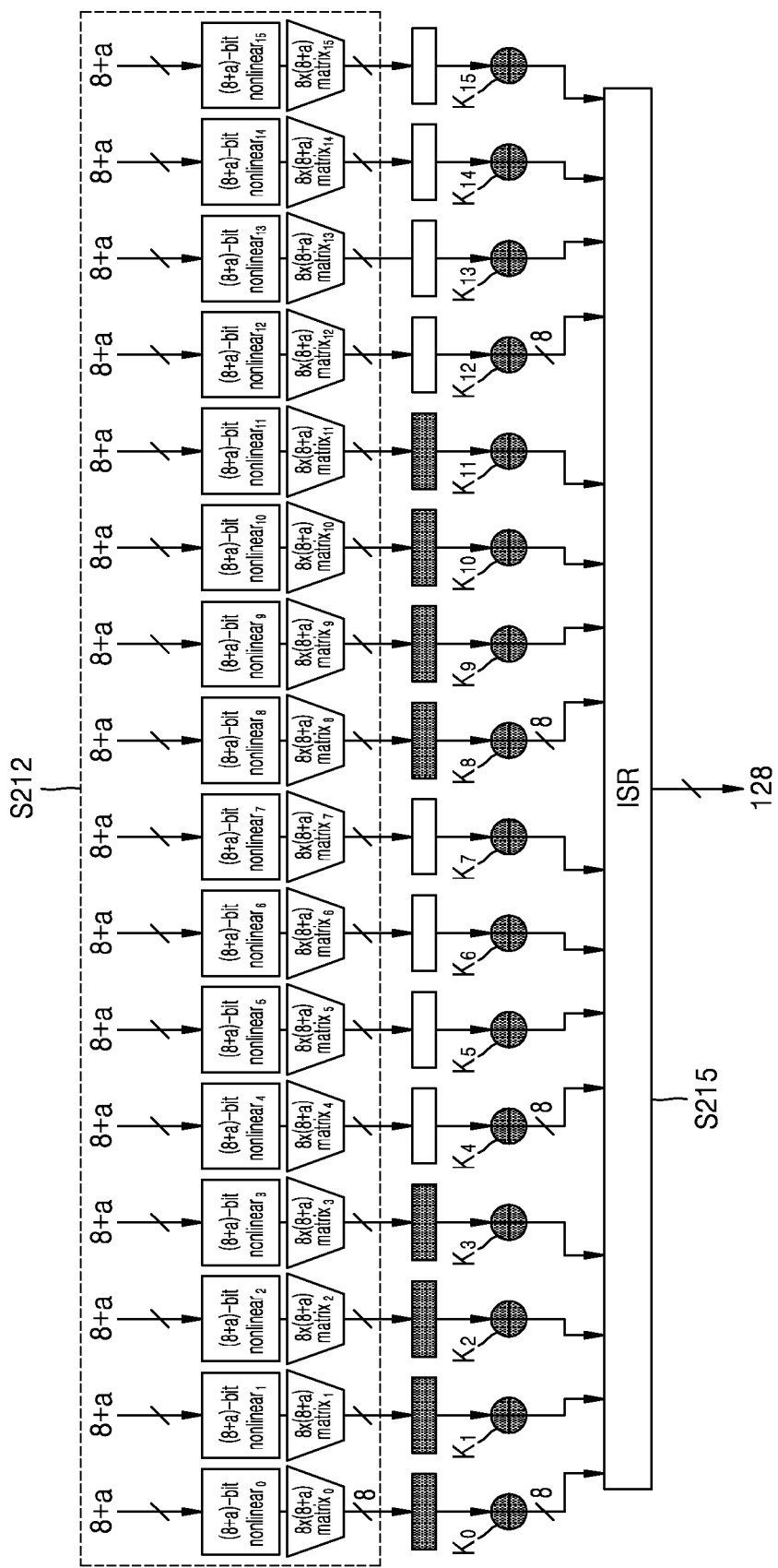
Figure 5D:
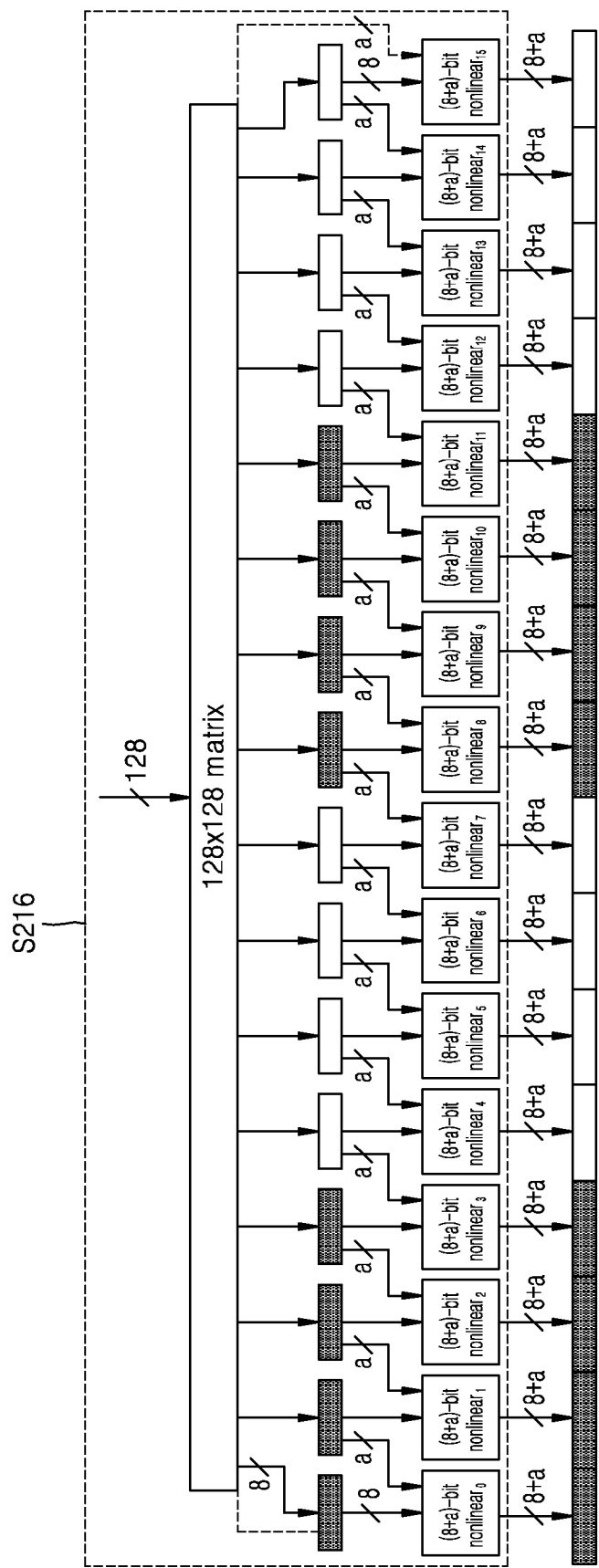

FIGS. 5A through 5D are detailed diagrams for describing an embodiment of a final round operation. FIG. 5A is a detailed flowchart of a final round operation. FIG. 5B is a conceptual diagram for describing formation of input data. Also, FIG. 5C is a conceptual diagram for describing a decoding operation and operation processing of a decryption algorithm. FIG. 5D is a conceptual diagram for describing an encoding operation. Although N is 16, Y is 8, and X is 8+a (a is a positive integer greater than 0 and equal to or less than 8) in FIGS. 5A through 5D, this is merely an example and embodiments are not limited thereto.

Referring to FIG. 5A, in an initial round operation, a decoding operation S212, an addroundkey operation S214, an inverse shiftrows operation S215, and an encoding operation S216 may be sequentially performed. The inverse shiftrows operation S215 may perform, for example, a permutation operation of shifting each component of a matrix loaded to the state buffer STB by a preset number of times in a row unit according to rows.

The data E_DTa that is input data may be data of (8+a)*16 bits and may be transformed into data of 128 bits through the decoding operation S212. Accordingly, the addroundkey operation S214 and the inverse shiftrows operation S215 may be performed based on the data of 128 bits and the subkey Subkey_10 of 128 bits. Also, the data of 128 bits on which the inverse shiftrows operation S215 is completed may be transformed into data of (8+a)*16 bits through the encoding operation S216. The data of (8+a)*16 bits output by encoding operation S216 may be referred to as intermediate data and may be input to an intermediate round operation.

Referring to FIG. 5B, the data E_DTa may be transformed into data of (8+a)*16 bits by performing a bit number correction operation on original data OE_DTa. The original data OE_DTa may be, for example, an initial type of encryption data input to perform a decryption algorithm.

In an embodiment, the bit number correction operation may be performed by dividing the original data OE_DTa into 16 units of 8 bits and combining a bits from among bits included in each unit with 8 bits of another unit. For example, (8+a) bits of the data E_DTa may be formed by combining 8 bits of a first unit of the original data OE_DTa with a bits of a second unit of the original data OE_DTa. Although 8 bits and a bits in two adjacent units are used in the present embodiment, this is merely an example and embodiments are not limited thereto. The bit number correction operation may be referred to as an 'input bit multi-use method'. The input bit multi-use method may be represented as a linear function corresponding to, for example, a [(8+a)*16]×128 matrix.

In an embodiment, the bit number correction operation may be performed outside the encryption/decryption device, and the encryption/decryption device may operate by receiving the data E_DTa on which the bit number correction operation is performed. However, embodiments are not limited thereto, and the bit number correction operation may be performed inside the encryption/decryption device.

Referring to FIG. 5C, in the decoding operation S212, the data E_DTa that is input data may be divided into 16 units of (8+a) bits, and an (8+a)-bit nonlinear function and a linear function that may be represented as a 8×(8+a) matrix may be applied to each unit. Accordingly, each unit of (8+a) bits may be transformed into a unit of 8 bits.

In the addroundkey operation S214, an XOR operation may be performed between each of bytes k0 through k15 of the subkey Subkey_10 and each byte of the data E_DTa decoded into 128 bits. Next, the inverse shiftrows operation S215 may be performed on an output value of the XOR operation.

Referring to FIG. 5D, in the encoding operation S216, a 128×128 matrix-linear function may be applied to the data of 128 bits, and thus the data of 128 bits may be divided into 16 units of 8 bits. In the present specification, the term 'matrix-linear function' may refer to a linear function that may be represented as a matrix. For example, the 128×128 matrix-linear function may refer to a linear function that may be represented as a 128×128 matrix.

The 16 units may be respectively transformed into 16 units of (8+a) bits by using an 'input bit multi-use method'. An (8+a)-bit nonlinear function may be applied to each of the 16 units of (8+a) bits. Accordingly, data of 16*(8+a) bits may be output according to a final round operation.

Figure 6A:
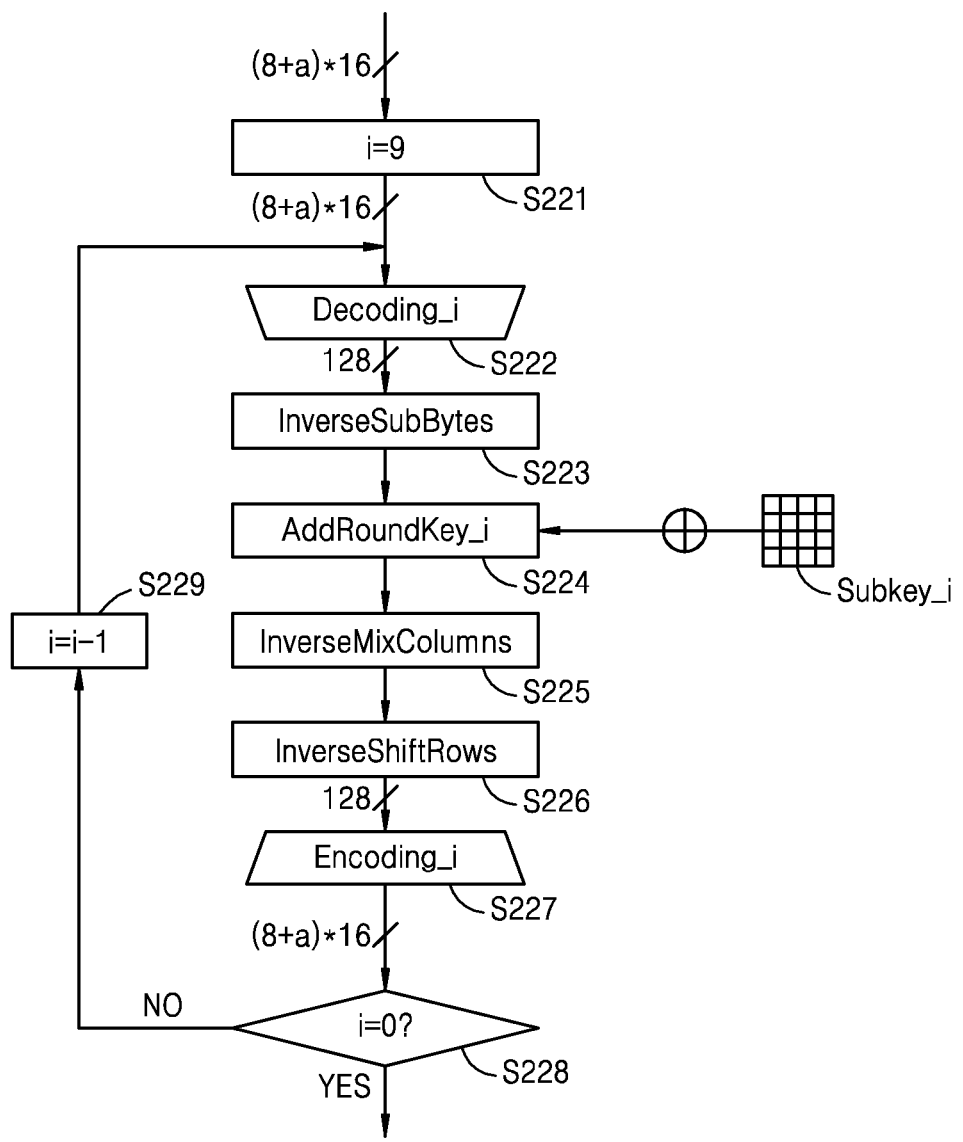
FIGS. 6A and 6B are detailed diagrams for describing an embodiment of intermediate round operations.
Figure 6B:
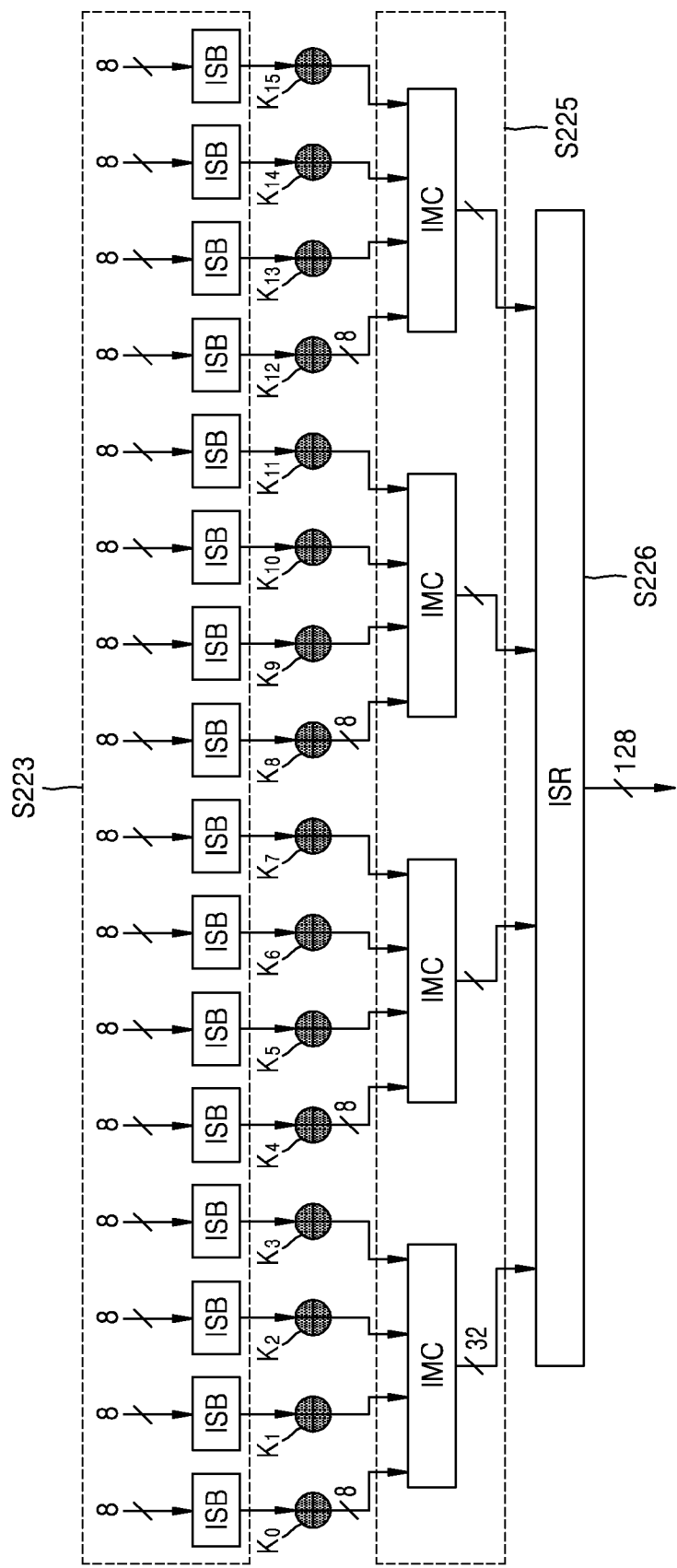

FIGS. 6A and 6B are detailed diagrams for describing an embodiment of intermediate round operations. FIG. 6A is a detailed flowchart of intermediate round operations. FIG. 6B is a conceptual diagram for describing operation processing of a decryption algorithm.

Referring to FIG. 6A, in an intermediate round operation, a decoding operation S222, an inverse subbytes operation S223, an addroundkey operation S224, an inverse mixcolumns operation S225, an inverse shiftrows operation S226, and an encoding operation S227 may be performed. In the inverse subbytes operation S223, for example, a nonlinear operation of replacing each byte of data with another byte according to a lookup table may be performed. The inverse mixcolumns operation S225 may be, for example, an operation of combining 4 bytes of each column of a matrix loaded to the state buffer STB based on a linear transformation. In this case, each column may be performed by using a four-term polynomial.

Intermediate data input to the intermediate round operation may be intermediate data of (8+a)*16 bits, and may be transformed into intermediate round data of 128 bits through the decoding operation S222. Accordingly, the inverse subbytes operation S223, the addroundkey operation S224, the inverse mixcolumns operation S225, and the inverse shiftrows operation S226 may be performed based on the intermediate round data of 128 bits and the subkey Subkey_i of 128 bits. Also, the intermediate round data of 128 bits on which the inverse shiftrows operation S227 is completed may be transformed into intermediate data of (8+a)*16 bits through the encoding operation S227.

Referring to FIG. 6B, the intermediate round data of 128 bits obtained through the decoding operation S222 may be divided into 16 units of 8 bits, and the inverse subbytes operation S223 and the addroundkey operation S224 may be performed on each unit. That is, the inverse subbytes operation S223 is performed on each byte of the intermediate round data, and then an XOR operation may be performed between each byte and each of the bytes k0 through k15 of the subkey Subkey_i.

Next, the inverse mixcolumns operation S225 may be performed by using 4 bytes on which the addroundkey operation S224 is performed as one unit input. Next, the inverse shiftrows operation S226 may be performed by using four 4-byte units on which the inverse mixcolumns operation S225 is performed as an input.

Figure 7A:
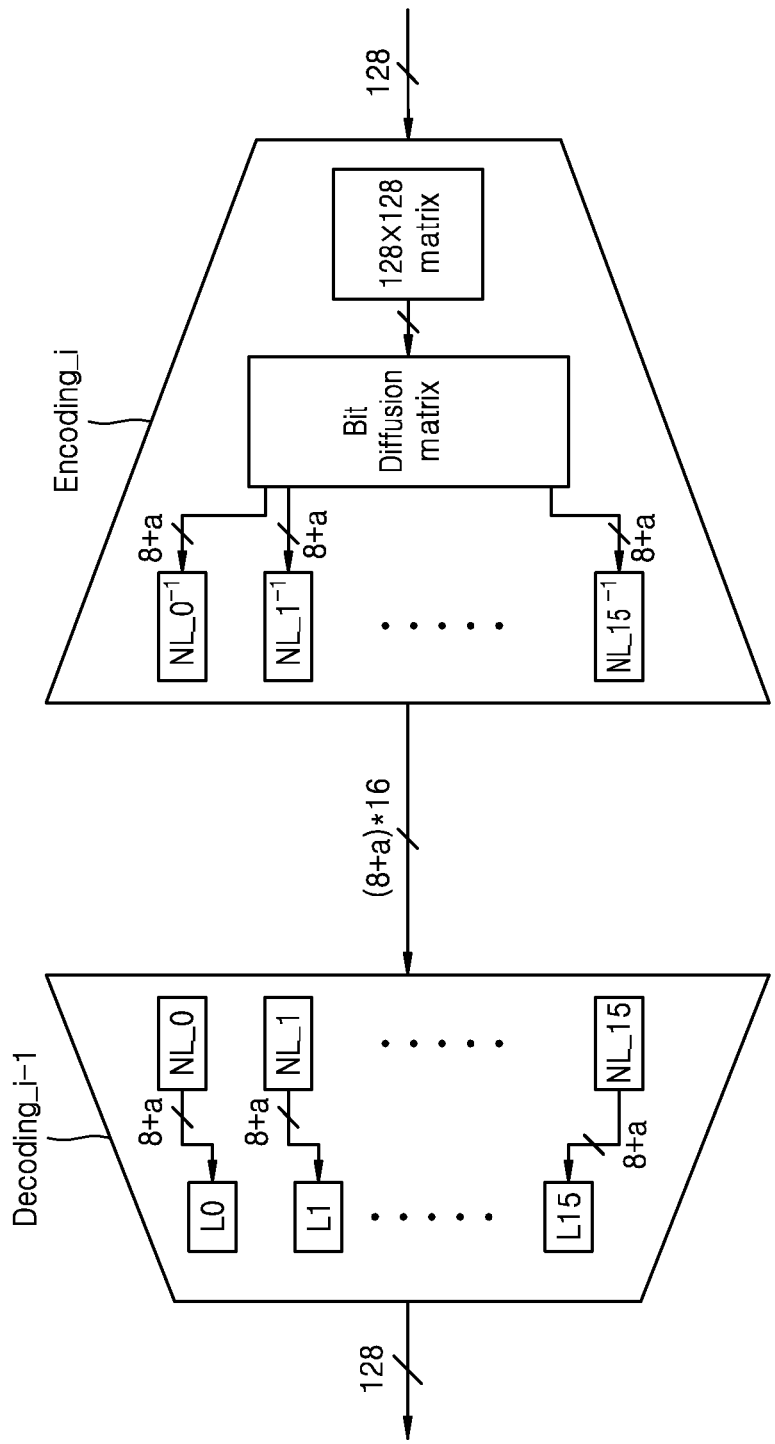
FIGS. 7A and 7B are diagrams for describing an embodiment of an encoding operation and a decoding operation for one or more intermediate round operations.
Figure 7B:
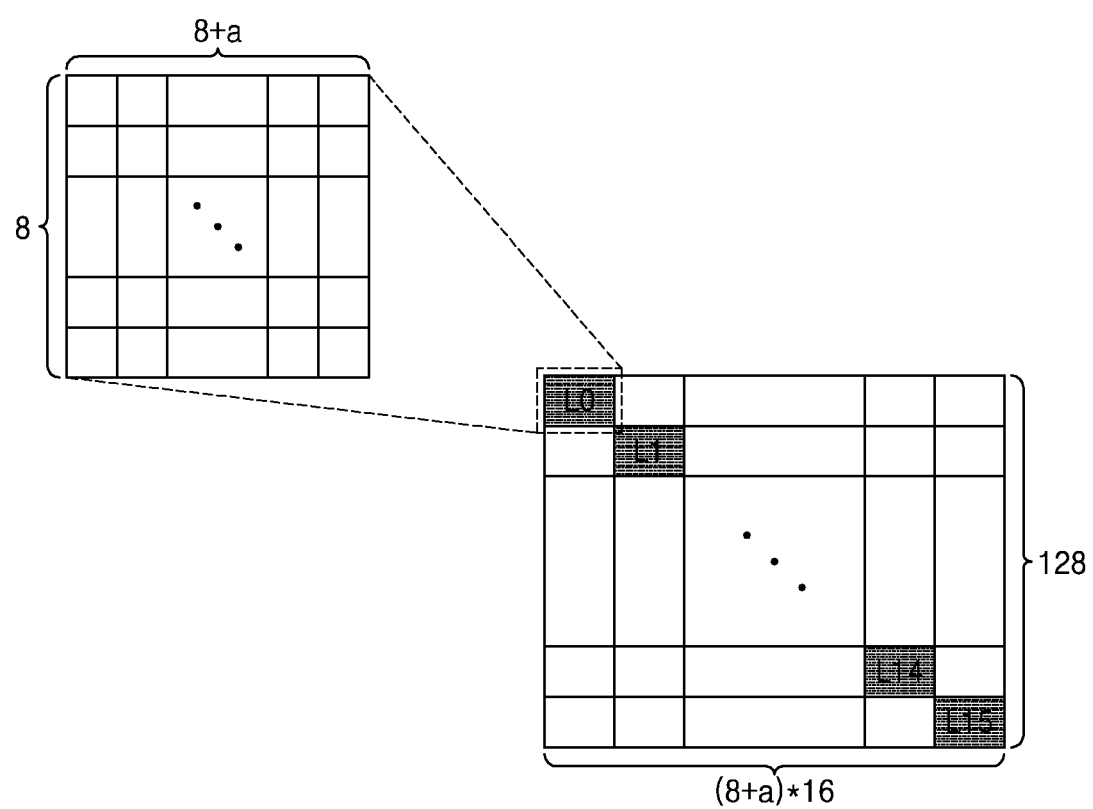

FIGS. 7A and 7B are diagrams for describing an embodiment of an encoding operation and a decoding operation for one or more intermediate round operations. In detail, FIG. 7A is a conceptual diagram for describing a relationship between an encoding operation and a decoding operation. FIG. 7B illustrates a matrix corresponding to a linear function used in a decoding function.

Referring to FIG. 7A, intermediate round data of 128 bits may be transformed into intermediate round data of (8+a)*16 bits through an encoding operation of an $i^{th}$ intermediate round operation, and a decoding operation of an $(i-1)^{th}$ intermediate round operation (i.e., an intermediate round operation performed next to the $i^{th}$ intermediate round operation) may be performed on the intermediate round data of (8+a)*16 bits. In an embodiment, in an encoding operation, a 128×128 matrix-linear function may be applied to the intermediate round data of 128 bits, and a [(8+a)*16]×128-bit diffusion matrix operation may be applied to use an input bit multi-use method. Accordingly, nonlinear functions $NL\_0^{-1}$ through $NL\_15^{-1}$ may be respectively performed on divided 16 units of (8+a) bits each. Each of the nonlinear functions $NL\_0^{-1}$ through $NL\_15^{-1}$ may be an 8_a-bit nonlinear function and inputs and outputs data of (8+a) bits.

A decoding operation may be performed on the intermediate round data of (8+a)*16 bits output through the encoding operation. In the decoding operation, the data of (8+a)*16 bits may be divided into 16 units of (8+a) bits, and each unit may be input to each of nonlinear functions NL_0 through NL_15. That is, each of the nonlinear functions NL_0 through NL_15 is an (8+a)-bit nonlinear function and receives and outputs data of (8+a) bits. In an embodiment, each of the nonlinear functions $NL\_0^{-1}$ through $NL\_15^{-1}$ used in the encoding operation of an $i^{th}$ intermediate round operation and each of the nonlinear functions NL_0 through NL_15 used in the decoding operation of an $(i-1)^{th}$ intermediate round operation may be inverse to each other. Each of linear functions L0 through L15 may be applied to each unit of (8+a) bits output from each of the nonlinear functions NL_0 through NL_15.

Referring to FIG. 7B, a matrix L corresponding to the linear functions L0 through L15 applied to the decoding operation is illustrated. The matrix L may include each linear function and may be represented as a 128×((8+a)) matrix. Also, each of the linear functions L0 through L15 may be represented as an 8×(8+a) matrix. In this case, a relationship between $[1_{m,n}]$ that is an $m^{th}$ row and $n^{th}$ column component of the matrix L and $(Li)s,t$ that is an $s^{th}$ row and $t^{th}$ column component of a matrix Li may be defined as shown in Equation 2.

$$l_{Sm+s,Sn+t} = \begin{cases} (L,m)_{s,t}, & \text{if} \quad 15, s = 0, \ldots 7, \text{ and} \\ m = n = 0, \ldots, \quad t = 0, \ldots, 7+a \\ 0, & \text{Otherwise} \end{cases} \quad (2)$$

Accordingly, the encoding operation of the $i^{th}$ intermediate round operation and the decoding operation of the $(i-1)^{th}$ intermediate round operation may be cancelled out. That is, since the number of bits is changed based on the encoding and decoding operations while operation processing for deriving an intermediate result value in each round operation is maintained, a third party's access to the intermediate result value may be blocked.

A relationship between an encoding operation of an $i^{th}$ intermediate round operation and a decoding operation of an $(i-1)^{th}$ intermediate round operation described with reference to FIGS. 7A and 7B may also be applied to a relationship between an encoding operation of a final round operation and a decoding operation of an initial round operation (e.g., an intermediate round operation with a variable i of 9) from among intermediate round operations. Also, the relationship may also be applied to a relationship between an encoding operation of a final round operation (e.g. an intermediate round operation with a variable i of 1) and a decoding operation of an initial round operation from among intermediate round operations.

Figure 8:
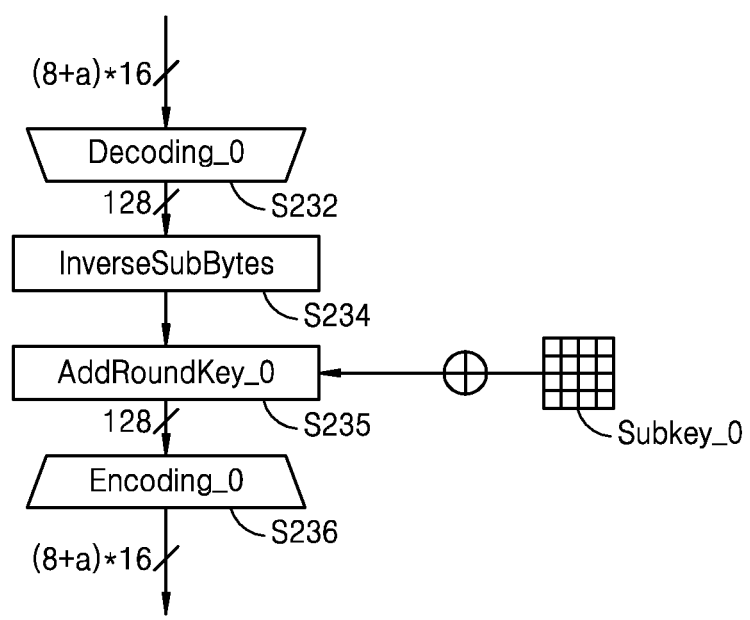
FIG. 8 is a detailed flowchart for describing an embodiment of an initial round operation.

FIG. 8 is a detailed flowchart for describing an embodiment of an initial round operation.

Referring to FIG. 8, in an initial round operation, a decoding operation S232, an inverse subbytes operation S234, an addroundkey operation S235, and an encoding operation S236 may be performed. Intermediate round data input to the initial round operation, for example from intermediate round operation as described above with respect to FIGS. 6A-B and 7A-B, may be data of (8+a)*16 bits, and may be transformed into initial round data of 128 bits through the decoding operation S232. Accordingly, the inverse subbytes operation S234 and the addroundkey operation S235 may be performed based on the initial round data of 128 bits and the subkey Subkey_0 of 128 bits. Also, the initial round data of 128 bits on which the addroundkey operation S235 is completed may be transformed into initial round data of (8+a)*16 bits through the encoding operation S236.

Figure 9A:
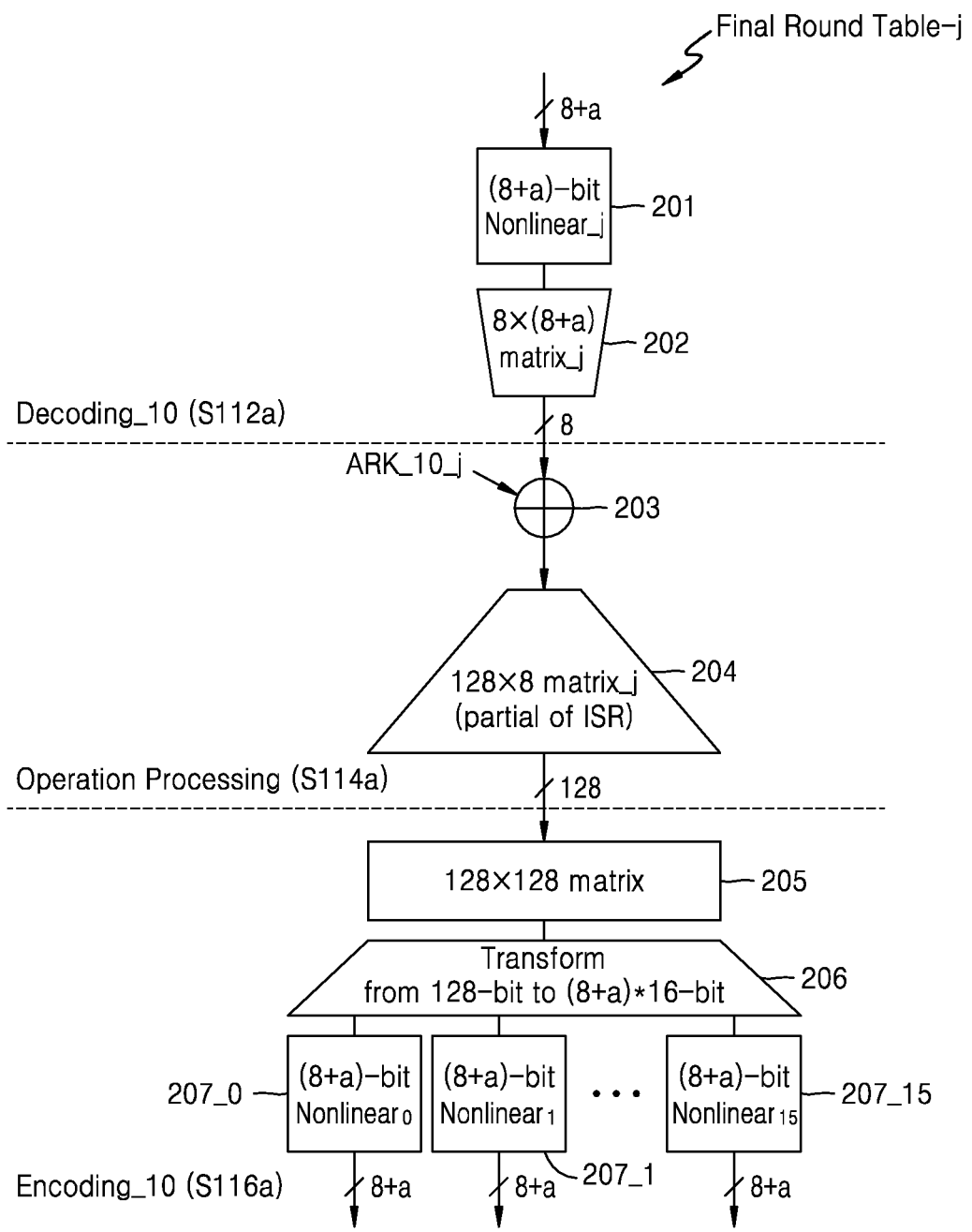
FIG. 9A is a conceptual diagram illustrating a table generated in an embodiment of a final round operation.
Figure 9B:
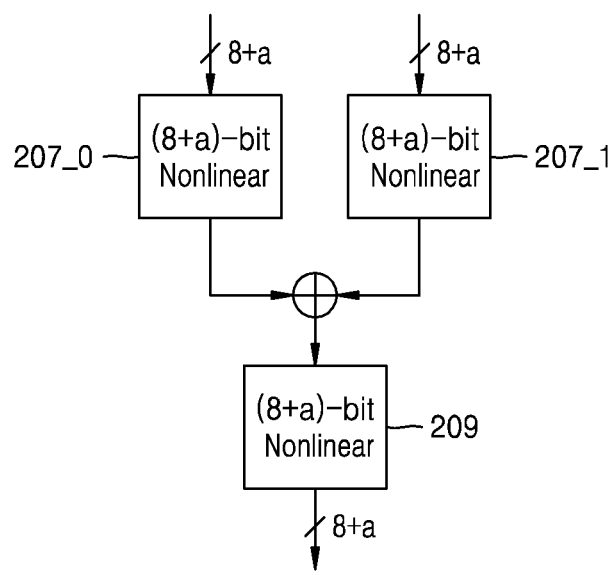
FIG. 9B is a conceptual diagram for describing an XOR operation performed in an encoding operation of FIG. 9A.

FIG. 9A is a conceptual diagram illustrating a table generated to correspond to an embodiment of a final round operation. FIG. 9B is a conceptual diagram for describing an XOR operation performed in an encoding operation of FIG. 9A. The table may refer to, for example, a lookup table corresponding to the final round operation, and the lookup table may be used to calculate and store intermediate operation data of the final round operation in advance. In the present embodiment, a conceptual diagram of a $j^{th}$ table is illustrated, and j may be an integer between, for example, 0 and 15. That is, the final round operation may be performed by using, for example, 16 lookup tables and an XOR-Table.

Referring to FIG. 9A, the lookup table generated according to the final round operation may include a decoding operation S112a, an operation processing S114a of a decryption algorithm, and an encoding operation S116a. The decoding operation S112a may output data of 8 bits by applying an (8+a)-bit nonlinear function 201 and an 8×(8+a) matrix-linear function 202 to data of (8+a) bits.

The operation processing S114a of the final round operation may be performed on the data of 8 bits. For example, in the operation processing S114a, for example, an addroundkey operation 203 and an inverse shiftrows operation 204 may be performed. In an embodiment, in the inverse shiftrows operation 204, a 128×8 matrix-linear function may be applied to the data of 8 bits, the data of 8 bits may be transformed into data of 128 bits, and the data of 128 bits may be output.

In the encoding operation S116a, a 128×128 matrix-linear function 205 may be applied to the data transformed into a 128×128 matrix. Accordingly, through a bit number correction operation 206 on the output data of 128 bits, the data of 128 bits may be transformed into data of (8+a)*16 bits. For example, the bit number correction operation 206 may be performed by using an 'input bit multi-use method'. An (8+a)-bit nonlinear function may be applied to the data of (8+a)*16 bits. The data of (8+a)*16 bits may be divided into sixteen groups of (8+a) bits and may be extended to (8+a) *16 bits through the 16 lookup tables, and then may become data of (8+a)*16 bits through an XOR-Table operation, which may be the same as a result of the final round operation.

Further referring to FIG. 9B, (8+a)-bit nonlinear functions 207_0 and 207_1 each may be applied to data of (8+a) bits and an XOR operation may be performed on resultant values. An (8+a)-bit nonlinear function 209 may be applied to a resultant value of the XOR operation and data of (8+a) bits may be output. For example, sixteen groups pf (8+a)*16 bits may be transformed into one group of (8+a)*16 bits through fifteen XOR-Table operations.

Figure 10:
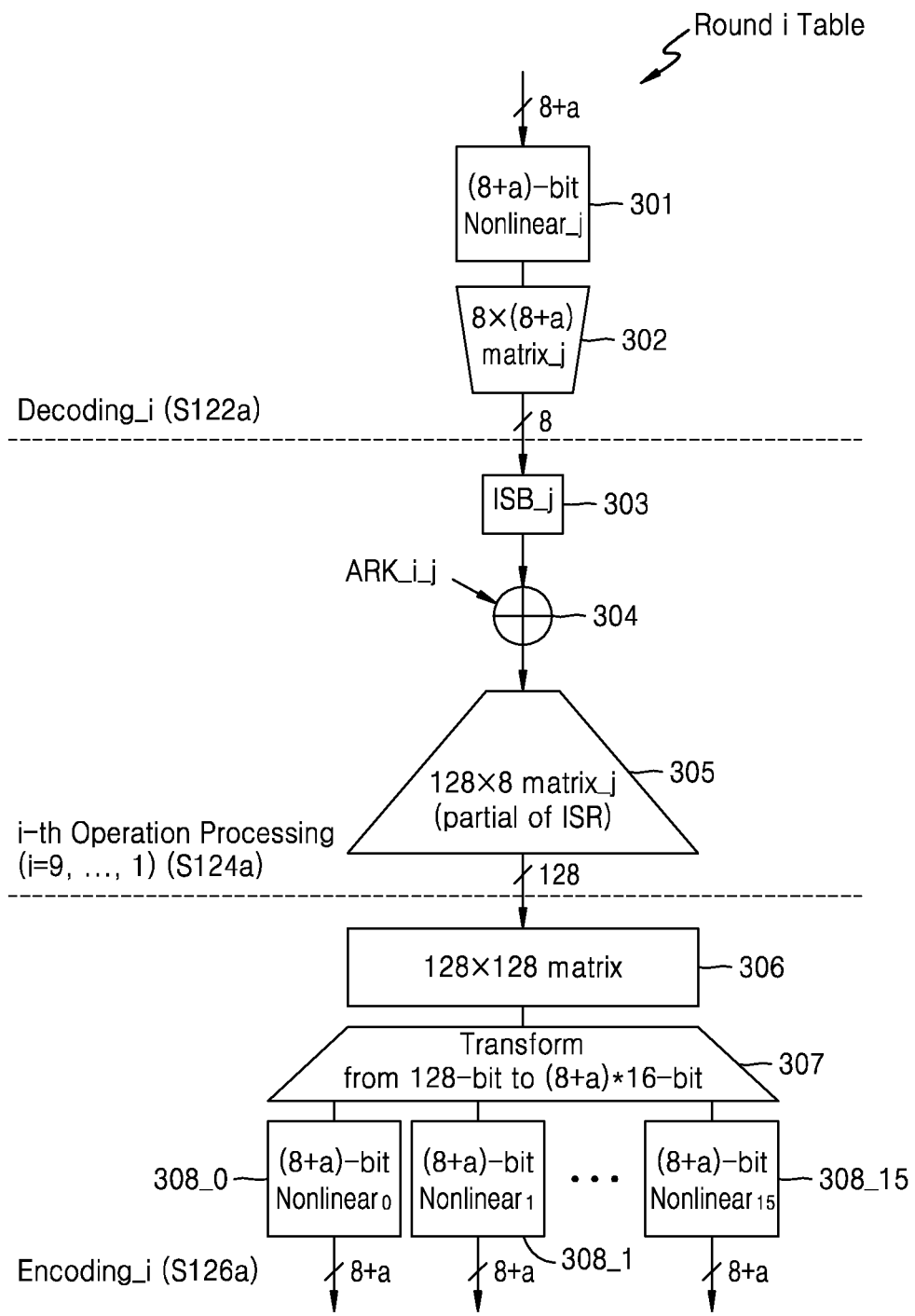
FIG. 10 is a conceptual diagram illustrating a table generated in an embodiment of an intermediate round operation.

FIG. 10 is a conceptual diagram illustrating a table generated in an embodiment of an intermediate round operation. The table may refer to a lookup table corresponding to the intermediate round operation. The lookup table may be used to calculate and store intermediate operation data of the intermediate round operation in advance. The intermediate round operation may be performed by using, for example, 16 lookup tables and an XOR-Table.

Referring to FIG. 10, the intermediate round operation may be repeatedly performed a plurality of times. Accordingly, a lookup table may be derived in each intermediate round operation. Although 9 intermediate round operations are performed in the present embodiment, embodiments are not limited thereto.

The lookup table generated according to the intermediate round operation may include a decoding operation, operation processing of a decryption algorithm, and an encoding operation. In the operation processing in the intermediate round operation, an inverse subbytes operation, an addroundkey operation, an inverse mix-column and inverse shiftrows operation may be performed. In an embodiment, during some of the inverse mix-column and inverse shiftrows operation, data of 8 bits obtained through the inverse subbytes operation and the addroundkey operation may be transformed into 128 bits, may be extended and transformed into (8+a)*16 bits through the encoding operation, and may be output. Input data of the intermediate round operation may be divided into sixteen groups of (8+a) bits, and may each be extended to (8+a)*16 bits through a lookup table, and the sixteen groups of (8+a)*16 bits may be transformed into one group of (8+a)*16 bits through fifteen XOR-Table operations, which may be the same as a result of the intermediate round operation.

Figure 11:
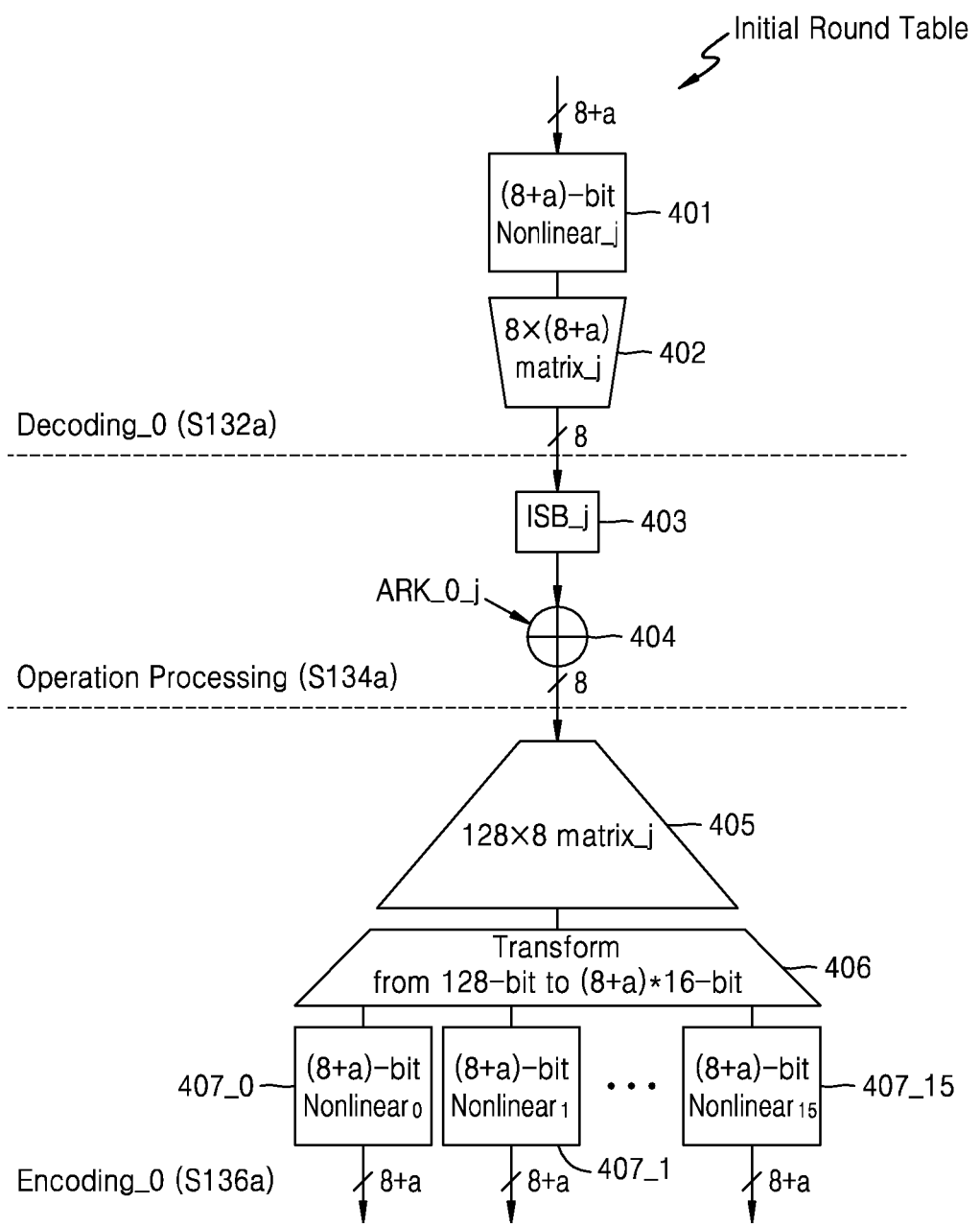
FIG. 11 is a conceptual diagram illustrating a table generated in an embodiment of an initial round operation.

FIG. 11 is a conceptual diagram illustrating a table generated in an embodiment of an initial round operation. The table may refer to, for example, a lookup table corresponding to the initial round operation.

Referring to FIG. 11, the lookup table generated according to the initial round operation may include a decoding operation, an operation processing of a decryption algorithm, and an encoding operation. In the operation processing of the initial round operation, an inverse subbytes operation and an addroundkey operation may be performed.

Figure 12A:
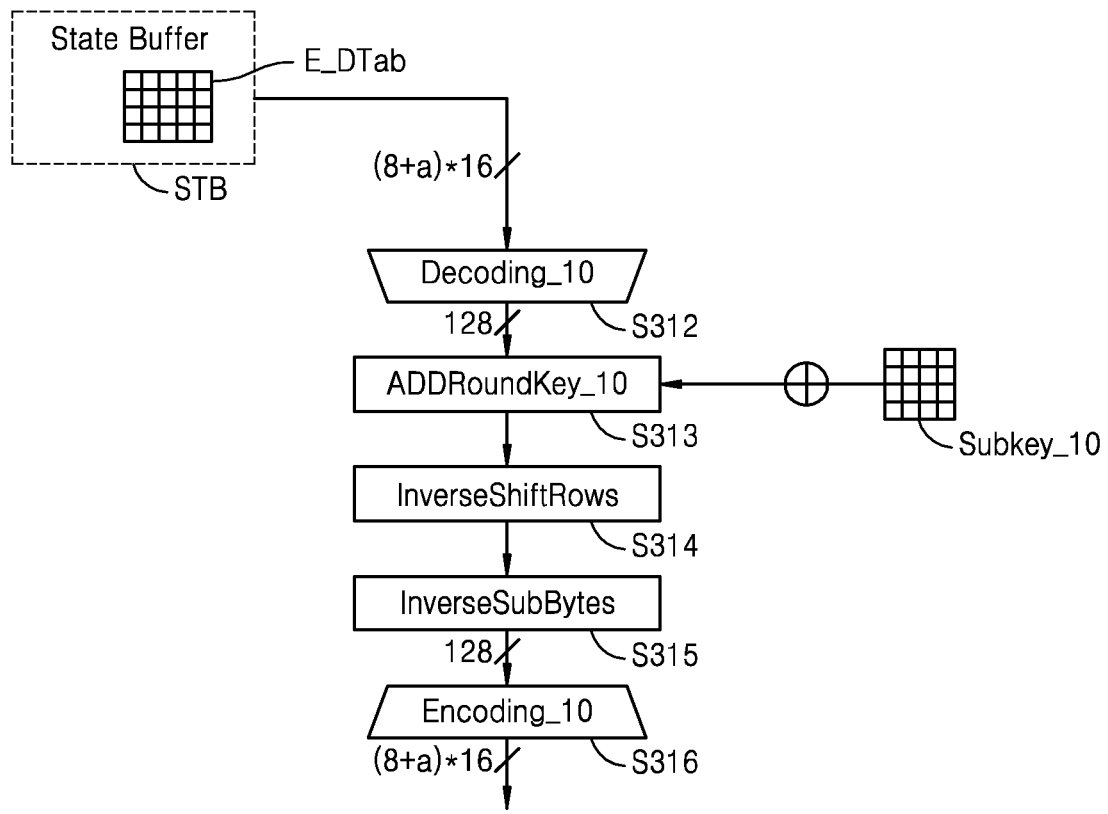
FIGS. 12A, 12B and 12C are diagrams for describing an embodiment of an operation method of an encryption/decryption device.
Figure 12B:
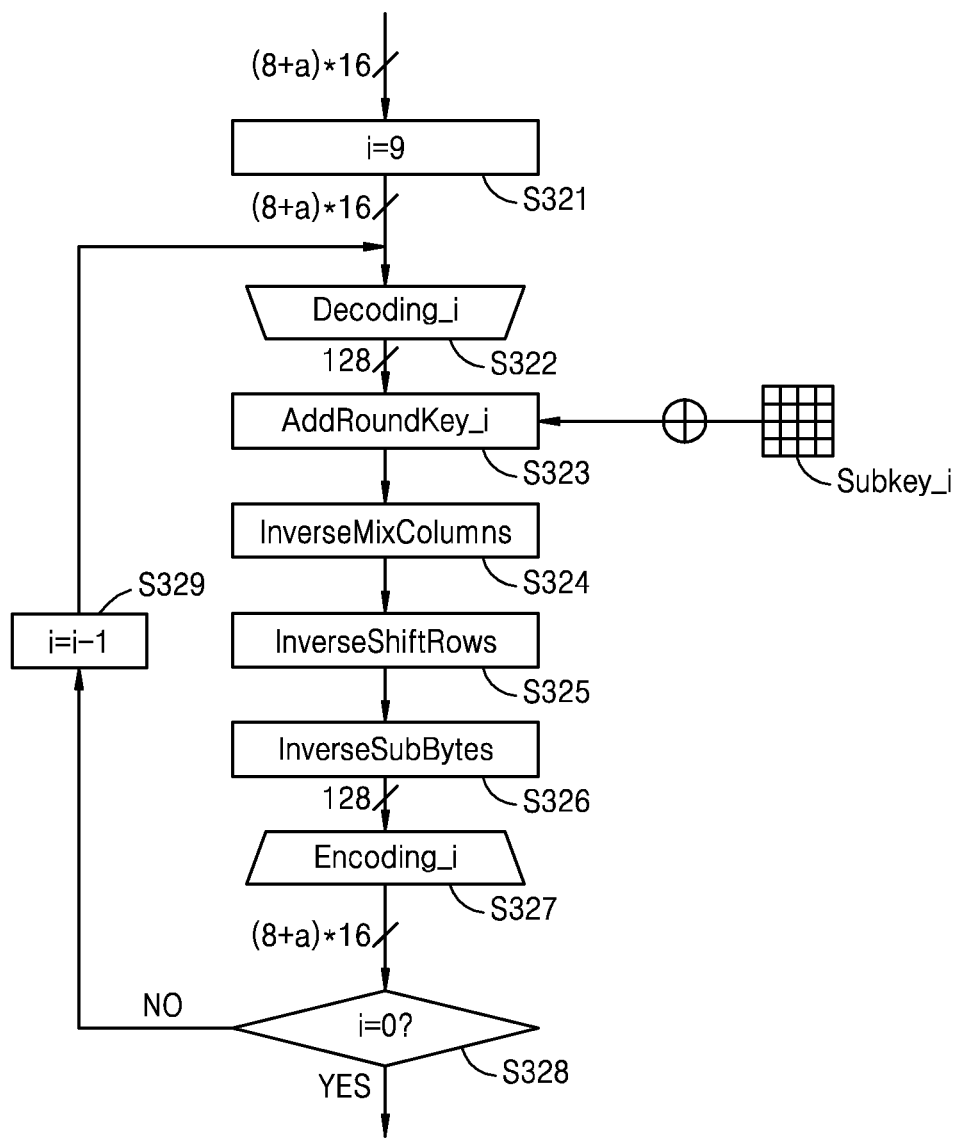
Figure 12C:
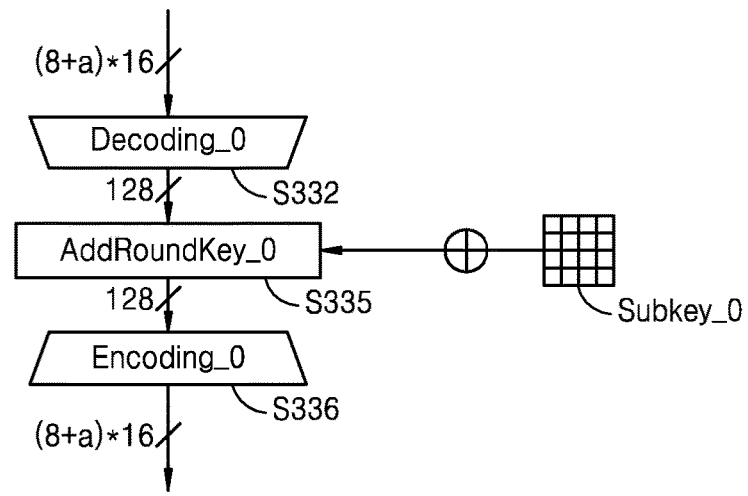

FIGS. 12A through 12C are diagrams for describing an embodiment of an operation method of an encryption/decryption device. In detail, FIG. 12A is a flowchart for describing a final round operation. FIG. 12B is a flowchart for describing an intermediate round operation. FIG. 12C is a flowchart for describing an initial round operation. In FIGS. 12A through 12C, the same elements as those in FIGS. 5A, 6A, and 8 will not be repeatedly described.

Referring to FIG. 12A, in a final round operation, a decoding operation S312, an addroundkey operation S313, an inverse shiftrows operation S314, an inverse subbytes operation S315, and an encoding operation S316 may be performed. Also, referring to FIG. 12B, in an intermediate round operation, a decoding operation S322, an addroundkey operation S323, an inverse mixcolumns operation S324, an inverse shiftrows operation S325, an inverse subbytes operation S326, and an encoding operation S327 may be performed. Also, referring to FIG. 12C, in an initial round operation, a decoding operation S332, an addroundkey operation S335, and an encoding operation S336 may be performed.

Figure 13:
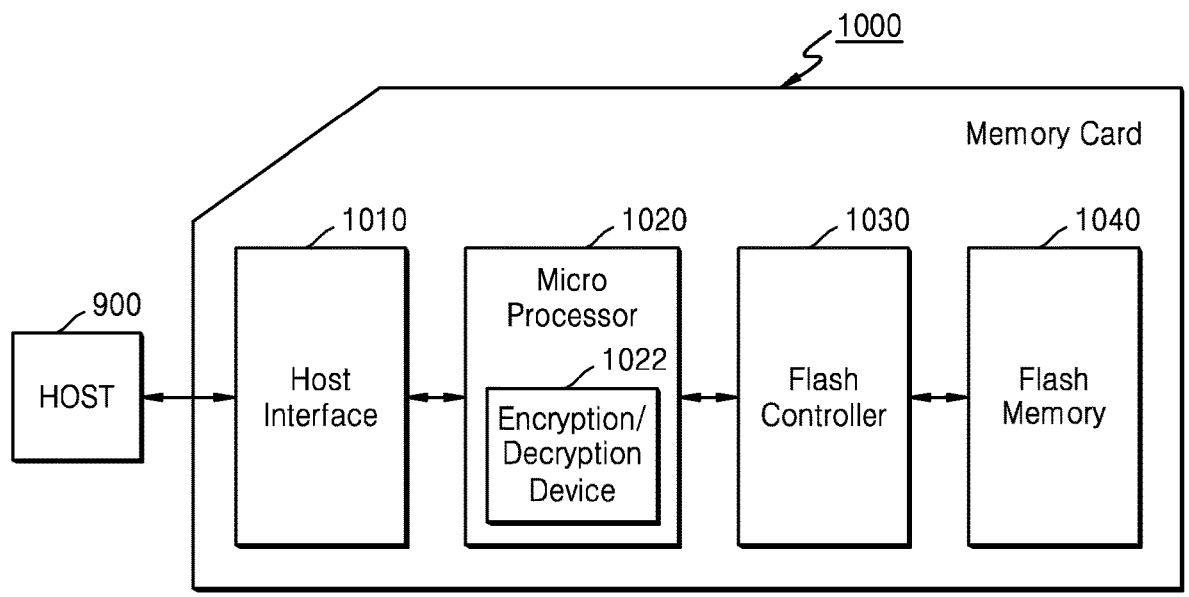
FIG. 13 is a block diagram of an embodiment of a memory card.

FIG. 13 is a block diagram of an embodiment of a memory card 1000.

Referring to FIG. 13, memory card 1000 may include a host interface 1010, a memory controller 1020, and a flash memory interface 1030. Also, memory controller 1020 may further include an encryption/decryption device 1022 according to an embodiment.

Host interface 1010 may interface with a host 900 through a card protocol in order to perform various data exchange between host 900 and memory card 1000. Memory card 1000 may be applied to a multimedia card (MMC), a security digital (SD) card, a miniSD card, a memory stick, a smartmedia card, and a transflash card.

Memory controller 1020 may transmit/receive data to/from a flash memory 140 through flash memory interface 1030. Flash memory 140 may be a nonvolatile memory such as a NAND flash memory. Memory controller 1020 may control various operations of flash memory 1040 through flash memory interface 1030.

Memory card 1000 may include encryption/decryption device 1022 according to an embodiment, and only input/output values of a lookup table on which an encryption operation is performed may be disclosed and an internal operation of the lookup table may not be known. Accordingly, since a third party finds it difficult to understand the lookup table and to derive a round key, the security of memory card 1000 may be improved.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been particularly shown and described with reference to embodiments thereof by using specific terms, the embodiments and terms have merely been used to explain the inventive concept and should not be construed as limiting the scope of the inventive concept as defined by the claims. The embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. An apparatus for decrypting input data of N*X bits (where N and X are positive integers) which are encrypted based on a block-level encryption algorithm, the apparatus comprising:
    an encryption/decryption controller comprising a state buffer configured to store the input data; and
    a data function circuit configured to sequentially perform, based on the input data, a final round operation of first decryption operation processing, a plurality of intermediate round operations of second decryption operation processing, and an initial round operation of third decryption operation processing,
    wherein the data function circuit is further configured to decode the input data into data of N*Y bits (where Y is a positive integer) whose number is different from a number of the N*X bits, perform the first decryption operation processing based on the data of N*Y bits, and encode the data of N*Y bits on which the first decryption operation processing is performed into intermediate data of N*X bits.

2. The apparatus of claim 1, wherein the data function circuit is further configured to decode the intermediate data of N*X bits into intermediate round data of N*Y bits, perform the second decryption operation processing based on the intermediate round data of N*Y bits, and encode the intermediate round data of N*Y bits on which the second decryption operation processing is performed into the intermediate round data of N*X bits.

3. The apparatus of claim 2, wherein the data function circuit is further configured to encode the intermediate round data of N*X bits into initial round data of N*Y bits, perform the third decryption operation processing based on the initial round data of N*Y bits, and encode the initial round data of N*Y bits on which the third decryption processing is performed into decryption data of N*X bits.

4. An operation method of an encryption/decryption device, the operation method comprising:
    receiving, via an interface of the encryption/decryption device input data of N*X bits (where N and X are positive integers) which are encrypted based on a block-level encryption algorithm;
    decoding the input data of N*X bits into data of N*Y bits (where Y is a positive integer) whose number is different from a number of N*X bits;
    performing first decryption operation processing of the block-level encryption algorithm on the data of N*Y bits;
    encoding the data of N*Y bits on which the first decryption operation processing is performed into intermediate data of N*X bits; and
    performing a plurality of intermediate decryption round operations of the block-level encryption algorithm on the intermediate data of N*X bits.

5. The operation method of claim 4, wherein the performing of the first decryption operation processing comprises performing an add-round-key operation and an inverse shift-rows operation on the data of N*Y bits.

6. The operation method of claim 4, wherein the performing of the plurality of intermediate decryption round operations comprises performing a plurality of intermediate round operations,
    wherein each of the plurality of intermediate round operations comprises:
    decoding the intermediate data of N*X bits into intermediate round data of N*Y bits;
    performing second decryption operation processing of the block-level encryption algorithm on the intermediate round data of N*Y bits; and
    encoding the intermediate round data of N*Y bits on which the second decryption operation processing is performed into the intermediate round data of N*X bits.

7. The operation method of claim 6, wherein the performing of the second decryption operation processing comprises performing an inverse subbytes operation, an add-round-key operation, an inverse mix-columns operation, and an inverse shift-rows operation on the intermediate round data of N*Y bits.

8. The operation method of claim 6, wherein the encoding of the intermediate round data of N*Y bits into the intermediate round data of N*X bits comprises dividing the data of N*Y bits into N pieces of Y-bit data and applying a nonlinear function to each of the N pieces of Y-bit data.

9. The operation method of claim 8, wherein the decoding of the intermediate data of N*X bits into the intermediate round data of N*Y bits in a first intermediate round operation from among the plurality of intermediate round operations comprises dividing the data of N*X bits into N pieces of X-bit data and applying an inverse function of the nonlinear function to each of the N pieces of X-bit data.

10. The operation method of claim 6, wherein the encoding of the intermediate round data of N*Y bits into the intermediate round data of N*X bits in each of the plurality of intermediate round operations comprises dividing the data of N*Y bits into N pieces of Y-bit data and applying a nonlinear function to each of the N pieces of Y-bit data, and
decoding the intermediate data of N*X bits into the round data of N*Y bits in each of intermediate round operations other than an initial intermediate round operation from among the plurality of intermediate round operations comprises dividing the data of N*X bits into N pieces of X-bit data and applying an inverse function of a nonlinear function used in a previous round to each of the N pieces of X-bit data.

11. The operation method of claim 6, further comprising:
decoding intermediate round data of N*X bits encoded in a last intermediate round operation from among the plurality of intermediate round operations into initial round data of N*Y bits;
performing third decryption operation processing of the block-level encryption algorithm on the initial round data of N*Y bits; and
encoding the initial round data of N*Y bits on which the third decryption operation processing is performed into decryption data of N*X bits.

12. The operation method of claim 11, wherein the performing of the third decryption operation processing comprises performing an inverse subbytes operation and an add-round-key operation on the initial round data of N*Y bits.

13. The operation method of claim 11, wherein the encoding of the intermediate round data of N*Y bits into the intermediate round data of N*X bits in the last intermediate round operation comprises dividing the intermediate round data of N*Y bits into N pieces of Y-bit data and applying a nonlinear function to each of the N pieces of Y-bit data,
wherein the decoding into the initial round data comprises dividing the intermediate round data of N*X bits into N pieces of X-bit data and applying an inverse function of the nonlinear function to each of the N pieces of X-bit data.

14. The operation method of claim 4, wherein $X=Y+a, (0<a\leq Y)$.

15. An operation method of an apparatus for decrypting input data of N*X bits (where N and X are positive integers) which are encrypted by using a block-level encryption algorithm, the operation method comprising:
receiving, via an interface of the apparatus receiving the input data and decoding the input data into data of N*Y bits (where Y is a positive integer) whose number is different from a number of N*X bits;
performing first decryption operation processing of the block-level encryption algorithm on the data of N*Y bits;
encoding the data of N*Y bits on which the first decryption operation processing is performed into intermediate data of N*X bits; and
performing a plurality of intermediate round operations of a preset number based on the intermediate data of N*X bits.

16. The operation method of claim 15, wherein the performing of the plurality of intermediate round operations comprises:
decoding the intermediate data of N*X bits into intermediate round data of N*Y bits;
performing second decryption operation processing on the intermediate round data of N*Y bits; and
encoding the intermediate round data of N*Y bits on which the second decryption operation processing is performed into intermediate round data of N*X bits.

17. The operation method of claim 16, wherein the encoding of the intermediate round data of N*Y bits on which the first decryption operation processing is performed into the intermediate round data of N*X bits comprises dividing the data of N*Y bits into N pieces of Y-bit data and sequentially applying a linear function and a nonlinear function to each of the N pieces of Y-bit data.

18. The operation method of claim 17, wherein the decoding of the intermediate data of N*X bits into the intermediate round data of N*Y bits comprises dividing the data of N*X bits into N pieces of X-bit data and applying an inverse function of the nonlinear function to each of the N pieces of X-bit data.

19. The operation method of claim 16, wherein the performing of the plurality of intermediate round operations comprises encoding the intermediate round data of N*Y bits into intermediate round data of N*X bits in a last intermediate round operation from among the plurality of intermediate round operations,
wherein the operation method further comprises:
decoding the intermediate round data of N*X bits into initial round data of N*Y bits;
performing third decryption operation processing on the initial round data of N*Y bits; and
encoding the initial round data of N*Y bits on which the third decryption operation processing is performed into decryption data of N*X bits.

20. The operation method of claim 19, wherein the encoding of the intermediate round data of N*Y bits into the intermediate round data of N*X bits in the last intermediate round operation comprises applying a linear function and a nonlinear function to the intermediate data of N*Y bits,
wherein the decoding into the initial round data of N*Y bits comprises dividing the intermediate round data of N*X bits into N pieces of X-bit data and applying an inverse function of the nonlinear function to each of the N pieces of X-bit data.

* * * * *